United States Patent
Kamei

(10) Patent No.: US 7,914,202 B2
(45) Date of Patent: Mar. 29, 2011

(54) FIRST DETECTING SHEET AND FIRST THERMOMETRIC SYSTEM FOR DETECTING AND MEASURING TEMPERATURE OF AN OBJECT UNDER TEST, SECOND DETECTING SHEET AND SECOND THERMOMETRIC SYSTEM FOR DETECTING AND MEASURING TEMPERATURE OF A DUMMY SUBSTRATE, AND HEAT TREATMENT APPARATUS USING SAME

(75) Inventor: Kenji Kamei, Kyoto (JP)

(73) Assignee: Sokudo Co., Ltd., Kyoto (JP)

( * ) Notice: Subject to any disclaimer, the term of this patent is extended or adjusted under 35 U.S.C. 154(b) by 457 days.

(21) Appl. No.: 11/930,963

(22) Filed: Oct. 31, 2007

(65) Prior Publication Data

US 2008/0279250 A1    Nov. 13, 2008

(30) Foreign Application Priority Data

Nov. 29, 2006  (JP) ................. 2006-322172
Dec. 5, 2006   (JP) ................. 2006-328310

(51) Int. Cl.
    *G01K 11/22* (2006.01)
(52) U.S. Cl. .......... 374/117; 374/166; 340/870.17; 340/584
(58) Field of Classification Search .......... 374/117, 374/166; 340/870.17, 584
    See application file for complete search history.

(56) References Cited

U.S. PATENT DOCUMENTS

| | | | |
|---|---|---|---|
| 2002/0130789 A1* | 9/2002 | Kano | 340/870.16 |
| 2003/0012255 A1* | 1/2003 | Koshimizu | 374/117 |
| 2008/0144695 A1* | 6/2008 | Hamada | 374/117 |

FOREIGN PATENT DOCUMENTS

| | | |
|---|---|---|
| JP | 11-307606 | 5/1999 |
| JP | 2000-091183 | 3/2000 |
| JP | 2002-124457 | 4/2002 |
| JP | 2004-140167 | 5/2004 |
| JP | 2007019155 A * | 1/2007 |

* cited by examiner

Primary Examiner — Lisa M Caputo
Assistant Examiner — Mirellys Jagan
(74) Attorney, Agent, or Firm — Kilpatrick Townsend & Stockton LLP

(57) ABSTRACT

A first thermometry system for measuring a temperature of an object under test includes a first detecting sheet having crystal oscillators arranged on a first sheet-like object formed of resin, and a first measuring device for measuring the temperature based on frequencies acquired from the crystal oscillators and corresponding to natural frequencies of the crystal oscillators. In this system, the first detecting sheet is placed in contact with the object under test, whereupon the crystal oscillators provide the natural frequencies corresponding to the temperature of the object under test. The first measuring device measures the temperature of the object under test accurately based on the frequencies corresponding to the natural frequencies.

9 Claims, 14 Drawing Sheets

FIRST DETECTING SHEET AND FIRST THERMOMETRIC SYSTEM FOR DETECTING AND MEASURING TEMPERATURE OF AN OBJECT UNDER TEST, SECOND DETECTING SHEET AND SECOND THERMOMETRIC SYSTEM FOR DETECTING AND MEASURING TEMPERATURE OF A DUMMY SUBSTRATE, AND HEAT TREATMENT APPARATUS USING SAME

CROSS-REFERENCES TO RELATED APPLICATIONS

This application claims priority to Japanese Patent Application 2006-322172, filed Nov. 29, 2006. The application also claims priority to Japanese Patent Application 2006-328310, filed Dec. 5, 2006. The disclosures of JP 2006-322172 and JP 2006-328310 are incorporated by reference in their entirety herein for all purposes.

BACKGROUND OF THE INVENTION

1. Field of the Invention

This invention relates to a first detecting sheet and a first thermometric system for detecting and measuring the temperature of an object under test, and a heat treatment apparatus using these sheet and system for heat-treating semiconductor substrates, glass substrates for liquid crystal displays, glass substrates for photomasks, or substrates for optical disks (hereinafter simply called "substrates"), and particularly to a technique for detecting temperature by using crystal oscillators. This invention relates also to a second detecting sheet and a second thermometric system for detecting and measuring the temperature of a dummy substrate having thermometric elements with coils or antennas connected to crystal oscillators, and a heat treatment apparatus using these sheet and system for heat-treating substrates, and particularly to a technique for detecting temperature by using crystal oscillators.

2. Description of the Related Art

Conventionally, this type of apparatus includes a heat-treating plate for heat-treating a substrate placed thereon, a chamber vertically movable above the heat-treating plate, sensor coils arranged in the chamber for transmitting and receiving electromagnetic waves, and a measuring unit for measuring temperature based on frequencies received by the sensor coils. A dummy substrate has a plurality of thermometric elements arranged thereon. Each thermometric element includes a crystal oscillator having a natural frequency variable with temperature, and a coil connected to the crystal oscillator and capable of transmitting and receiving electromagnetic wave to/from the above sensor coils in noncontact fashion. When this dummy substrate is placed on the heat-treating plate, the sensor coils will receive from the coils the electromagnetic waves corresponding to the natural frequencies of the crystal oscillators. The measuring unit acquires a temperature of the dummy substrate based on the electromagnetic waves received. Since there is no need to extend wiring from the dummy substrate in order to connect it to the measuring unit, the chamber can be lowered completely to seal heat-treating space. Therefore, the temperature of a substrate at the time of heat treatment can be reproduced and measured with the dummy substrate (as disclosed in Japanese Unexamined Patent Publication No. 2004-140167, for example).

(I) The conventional apparatus noted above has the following drawback.

The conventional apparatus can measure only the temperature of the dummy substrate since the crystal oscillators are fixedly provided for the dummy substrate. Thus, the apparatus has a drawback of being unable to measure the temperature of an ordinary substrate undergoing heat treatment, for example.

(II) The conventional apparatus has the following further drawback.

In the conventional apparatus, the sensor coils provided in the chamber cannot be moved closer beyond a fixed distance to the coils attached to the dummy substrate. For example, even when the chamber is lowered, the distance between the sensor coils and the coils is about 10 mm. Therefore, with the dummy substrate having a plurality of coils arranged at short intervals, each sensor coil communicates not only with an opposed coil but also with adjoining coils. As a result, the temperature of the dummy substrate cannot be measured with sufficient accuracy. If the thermometric elements were arranged at enlarged intervals, the temperature of the dummy substrate could be measured accurately. However, this would provide fewer locations for temperature measurement, resulting in an inconvenience that a temperature distribution over the surface of the dummy substrate cannot be obtained properly.

SUMMARY OF THE INVENTION

This invention has been made having regard to the state of the art noted above, and its object is (I) to provide a first detecting sheet and a first thermometric system for detecting and measuring the temperature of an object under test through contact with the object, and provide a heat treatment apparatus which can measure the temperature of substrates with sufficient accuracy. Another object of the invention is (II) to provide a second detecting sheet and a second thermometric system for detecting and measuring, in increased locations, the temperature of a dummy substrate having thermometric elements with sufficient accuracy, and provide a heat treatment apparatus which can measure the temperature of the dummy substrate with sufficient accuracy.

In order to fulfill the object (I), this invention provides a first detecting sheet for contacting an object under test and detecting a temperature of the object under test, comprising a first sheet-like object formed of resin; and crystal oscillators arranged on the first sheet-like object and having natural frequencies variable with temperature.

According to this invention, the crystal oscillators have natural frequencies according to the temperature of the object under test when the first detecting sheet contacts the object under test, whereby the temperature of the object under test is detected. With the first sheet-like object formed of resin, there is no possibility of metal contamination of the object under test.

In the invention described above, the first sheet-like object may have projections formed thereon for contacting and supporting the object under test, and the crystal oscillators may be mounted in the projections. The crystal oscillators mounted in the projection can detect the temperature of the object under test accurately, while an area of contact between the first detecting sheet and the object under test is restricted.

In the invention described above, the crystal oscillators may project from the first sheet-like object. This arrangement allows the crystal oscillators to contact the object under test easily, to detect the temperature of the object under test accurately.

The sheet may further comprise wires arranged inside the first sheet-like object and connected to the crystal oscillators, and an output terminal for connecting the wires to an external circuit.

With the wires connected to the crystal oscillators and connected through the output terminal to an external circuit, the external circuit can easily acquire the natural frequencies of the crystal oscillators.

In another aspect of the invention, a first thermometric system is provided for measuring a temperature of an object under test. The system comprises a first detecting sheet having crystal oscillators arranged on a first sheet-like object formed of resin; and a first measuring device for measuring the temperature based on frequencies acquired from the crystal oscillators and corresponding to natural frequencies of the crystal oscillators; the first detecting sheet being placed in contact with the object under test to measure the temperature of the object under test.

According to this invention, the crystal oscillators have natural frequencies according to the temperature of the object under test when the first detecting sheet contacts the object under test. The first measuring device can accurately measure the temperature of the object under test based on frequencies corresponding to the natural frequencies of the crystal oscillators. With the first sheet-like object formed of resin, there is no possibility of metal contamination of the object under test.

In the invention described above, the system may further comprise an oscillating circuit for outputting an oscillating frequencies corresponding to the natural frequencies of the crystal oscillators, the first measuring device measuring the temperature based on the oscillating frequencies outputted from the oscillating circuit. The oscillating circuit can output oscillating frequencies corresponding to the natural frequencies of the crystal oscillators.

In a further aspect of the invention, a heat treatment apparatus is provided for heat-treating a substrate, the apparatus comprising a heat-treating plate; and a first detecting sheet provided on the heat treating plate and having crystal oscillators arranged on a first sheet-like object formed of resin; the substrate being placed on the first detecting sheet.

According to this invention, the crystal oscillators have natural frequencies according to the temperature of the substrate when the substrate is placed on the first detecting sheet, whereby the temperature of the substrate is detected. Since the crystal oscillators have high heat resistance and the first sheet-like object also is heat-resistant, even a high temperature of the substrate can be measured accurately. Further, with the first sheet-like object formed of resin, there is no possibility of metal contamination of the substrate.

In the invention described above, the first sheet-like object may have projections formed thereon for contacting and supporting the substrate, and the crystal oscillators may be mounted in the projections. The crystal oscillators mounted in the projection can detect the temperature of the substrate accurately, while an area of contact between the first detecting sheet and the substrate is restricted.

In the invention described above, the crystal oscillators may be arranged to project from the first sheet-like object. Then, the crystal oscillators can easily contact the substrate, to detect the temperature of the substrate accurately.

In the invention described above, the apparatus may further comprise a closing device for closing lateral areas of a space formed between the substrate and the first detecting sheet; and exhaust bores for exhausting gas from the space. The closing device closes lateral areas of a minute space formed between the substrate and the first detecting sheet. By exhausting gas from the minute space through the exhaust bores, the minute space is reduced to negative pressure to hold the substrate by suction. Consequently, heat treatment can be carried out uniformly over the surface of the substrate.

In the invention described above, the apparatus may further comprise a first measuring device for measuring temperature based on frequencies acquired from the crystal oscillators and corresponding to natural frequencies of the crystal oscillators. Then, the first measuring device can accurately measure temperature based on frequencies corresponding to the natural frequencies of the crystal oscillators.

In order to fulfill the object (II), this invention provides a second detecting sheet for supporting a dummy substrate, comprising a second sheet-like object formed of resin for supporting the dummy substrate, the dummy substrate including thermometric elements each with a crystal oscillator having one of a coil and an antenna connected thereto; and sensor coils arranged in the second sheet-like object for wireless communication with the thermometric elements.

According to this invention, with the sensor coils arranged in the second sheet-like object, the sensor coils can be located sufficiently close to the thermometric elements when the dummy substrate is placed on the second sheet-like object. Thus, the sensor coils can communicate, with sensitivity and without wires, with the thermometric elements out of contact with the sensor coils. Further, even where the thermometric elements are arranged at short intervals, the sensor coils will not receive electromagnetic waves outputted from the thermometric elements not opposed thereto. Thus, the temperature of the dummy wafer can be detected accurately in an increased number of locations on the dummy wafer.

In the invention described above, the sensor coils may be mounted inside the second sheet-like object. Then, there is no possibility of metal contamination of an object such as a dummy substrate placed on the second sheet-like object.

In the invention described above, the second sheet-like object may have projections formed thereon for contacting and supporting the dummy substrate, and the sensor coils may be mounted in the projections. This arrangement can restrict an area of contact between the second detecting sheet and the dummy substrate.

In the invention described above, the sensor coils may be arranged to oppose the thermometric elements when the dummy substrate is placed. Then, the sensor coils can communicate with the thermometric elements with increased sensitivity.

In the invention described above, the sheet may further comprise wires arranged inside the second sheet-like object and connected to the sensor coils; and an output terminal for connecting the wires to an external circuit. Then, results of reception by the sensor coils can be outputted.

In a further aspect of the invention, a second thermometric system is provided for measuring a temperature of a dummy substrate including thermometric elements each with a crystal oscillator having one of a coil and an antenna connected thereto. This system comprises a second sheet-like object formed of resin for supporting the dummy substrate; sensor coils arranged in the second sheet-like object for wireless communication with the thermometric elements; and a second measuring device for measuring the temperature based on frequencies of electromagnetic waves received by the coil sensors.

According to this invention, with the sensor coils arranged in the second sheet-like object, the sensor coils can be located sufficiently close to the thermometric elements when the dummy substrate is placed on the second sheet-like object. Thus, the sensor coils can communicate, with sensitivity and without wires, with the thermometric elements out of contact with the sensor coils. Further, even where the thermometric elements are arranged at short intervals, the sensor coils will not receive electromagnetic waves outputted from the thermometric elements not opposed thereto. Thus, the second measuring device can measure the temperature of the dummy wafer accurately in an increased number of locations on the dummy wafer, based on the frequencies of electromagnetic waves received by the coil sensors.

In the invention described above, the sensor coils may be mounted inside the second sheet-like object. Then, there is no possibility of metal contamination of an object such as a dummy substrate placed on the second sheet-like object.

In the invention described above, the second sheet-like object may have projections formed thereon for contacting and supporting the dummy substrate, and the sensor coils may be mounted in the projections. This arrangement can restrict an area of contact between the second detecting sheet and the dummy substrate.

In the invention described above, the second measuring device may include a communication device for causing the sensor coils to send transmitter pulses with frequencies corresponding to natural frequencies of the crystal oscillators, and detecting the electromagnetic waves received by the sensor coils. The communication device can cause resonation of the crystal oscillators. After the resonation, the crystal oscillators provide damped oscillations with frequencies corresponding to temperatures thereof, and the coils output electromagnetic waves corresponding to the damped oscillations. Thus, the communication device can detect electromagnetic waves with frequencies corresponding to the temperatures of the crystal oscillators. The second measuring device measures temperature based on the electromagnetic waves detected by the communication device. In this way, the temperature of the dummy substrate can be determined accurately.

In a further aspect of the invention, a heat treatment apparatus is provided for heat-treating a substrate, the apparatus comprising a heat-treating plate; a second sheet-like object formed of a heat-resistant resin and placed on the heat-treating plate; and sensor coils arranged in the second sheet-like object for wireless communication with thermometric elements each with a crystal oscillator having one of a coil and an antenna connected thereto; wherein the second sheet-like object supports, as placed thereon, a dummy substrate having the thermometric elements.

According to this invention, with the sensor coils arranged in the second sheet-like object, the sensor coils can be located sufficiently close to the thermometric elements when the dummy substrate is placed on the second sheet-like object. Thus, the sensor coils can communicate, with sensitivity and without wires, with the thermometric elements out of contact with the sensor coils. Further, even where the thermometric elements are arranged at short intervals, the sensor coils will not receive electromagnetic waves outputted from the thermometric elements not opposed thereto. Thus, the temperature of the dummy wafer can be detected accurately in an increased number of locations on the dummy wafer. Since the crystal oscillators have high heat resistance and the second sheet-like object also is heat-resistant, even a high temperature of the dummy substrate can be measured accurately.

In the invention described above, the sensor coils may be mounted inside the second sheet-like object. Then, there is no possibility of metal contamination of a substrate or dummy substrate placed on the second sheet-like object.

In the invention described above, the second sheet-like object may have projections formed thereon for contacting and supporting the substrate, and the sensor coils may be mounted in the projections. This arrangement can restrict an area of contact between the second detecting sheet and the dummy substrate.

In the invention described above, the apparatus may further comprise a closing device for closing lateral areas of a space formed between the substrate and the second sheet-like object; and exhaust bores for exhausting gas from the space. The closing device closes lateral areas of a minute space formed between the substrate and the second detecting sheet. By exhausting gas from the minute space through the exhaust bores, the minute space is reduced to negative pressure to hold the substrate by suction. Consequently, heat treatment can be carried out uniformly over the surface of the substrate.

In the invention described above, the apparatus may further comprise a second measuring device for measuring temperature based on frequencies of electromagnetic waves received by the sensor coils. The second measuring device measures temperature based on the electromagnetic waves detected by the communication device. In this way, the temperature of the dummy substrate can be determined accurately.

This specification discloses also an invention relating to the following heat treatment apparatus:

(1) A sheet as defined in claim 1, wherein the object under test is a substrate.

According to the invention (1) above, the temperature of the substrate can be measured properly without causing metal contamination of the substrate.

(2) A sheet as defined in claim 1, wherein said first sheet-like object is resistant to heat.

According to the invention (2) above, even a high temperature of the object under test can be measured properly.

(3) A sheet as defined in claim 1, wherein at least part of said crystal oscillators are embedded in said first sheet-like object.

According to the invention (3) above, the crystal oscillators can be installed properly, with the first sheet-like object reduced in thickness.

(4) A sheet as defined in claim 1, wherein each of said crystal oscillators has a crystal piece housed in a ceramic container.

According to the invention (4) above, there is no possibility of metal contamination of the object under test.

(5) A sheet as defined in (4) above, wherein said container further houses an oscillating circuit for outputting oscillating frequencies corresponding to natural frequencies of said crystal oscillators.

According to the invention (5) above, there is no need for providing an oscillating circuit separately.

(6) A sheet as defined in claim 1, wherein said first sheet-like object includes coils or antennas connected to said crystal oscillators.

According to the invention (6) above, the crystal oscillators can communicate, through the coils or antennas and without wires, with circuits provided inside the first sheet-like object or outside the first detecting sheet. Thus, these circuits can be formed separately from the coils or antennas.

(7) A sheet as defined in (6) above, comprising sensor coils arranged inside said first sheet-like object separately from said coils or antennas to be capable of communication with the coils or antennas.

According to the invention (7) above, the sensor coils can communicate with the coils or antennas effectively.

(8) A system as defined in claim 5, wherein the object under test is a substrate.

According to the invention (8) above, the temperature of the substrate can be measured properly without causing metal contamination of the substrate.

(9) A system as defined in claim 6, wherein said crystal oscillators and said oscillating circuit are connected through a cable extending from said first detecting sheet.

According to the invention (9) above, the first thermometric system is realized properly.

(10) A system as defined in claim 6, wherein said first measuring device includes a reference signal source for outputting a reference frequency, a comparator for calculating deviations of said oscillating frequencies from said reference frequency, a storage device for storing beforehand information on a relationship between deviations of said oscillating frequencies from said reference frequency and temperatures, and a converting device for converting into a temperature the deviation obtained from said comparator with reference to said relationship information.

According to the invention (10) above, the first measuring device is realized properly.

(11) A system as defined in (9) above, wherein said reference signal source includes a reference crystal oscillator maintained at a predetermined temperature, and a reference frequency oscillating circuit for outputting a reference frequency corresponding to the natural frequency of said reference crystal oscillator.

According to the invention (11) above, the reference signal source is realized properly.

(12) A system as defined in claim 5, comprising sensor coils arranged in said first sheet-like object to be capable of communication, without wires, with coils or antennas connected to said crystal oscillators, said first measuring device measuring temperature based on frequencies of the electromagnetic waves received by said sensor coils.

According to the invention (12) above, the crystal oscillators can be arranged separately from the sensor coils.

(13) A system as defined in (12) above, wherein said sensor coils are arranged inside said first sheet-like object separately from said coils or antennas.

According to the invention (13) above, the sensor coils can communicate with the coils or antennas effectively in a non-contact manner.

(14) A system as defined in (12) above, wherein said first measuring device includes a communication device for causing said sensor coils to send transmitter pulses with frequencies corresponding to the natural frequencies of said crystal oscillators, and detecting the electromagnetic waves received by said sensor coils.

According to the invention (14) above, the first measuring device is realized properly.

(15) A system as defined in (12) above, wherein said first measuring device includes a storage device for storing beforehand information on a relationship between frequencies of said electromagnetic waves and temperatures, and a converting device for converting into a temperature the electromagnetic waves obtained from said communication device.

According to the invention (15) above, the first measuring device is realized properly.

(16) A sheet as defined in claim 13, wherein said sensor coils are opposed to coils or antennas arranged on the dummy substrate.

According to the invention (16) above, the sensor coils can communicate, with sensitivity with the coils or antennas.

(17) A sheet as defined in claim 13, wherein said second sheet-like object is resistant to heat.

According to the invention (17) above, even a high temperature of the dummy substrate can be detected effectively.

(18) A system as defined in claim 21, wherein said communication device detects electromagnetic waves corresponding to damped oscillations of said crystal oscillators obtained after said sensor coils send the transmitter pulses with the frequencies corresponding to the natural frequencies of said crystal oscillators.

According to the invention (18) above, the second measuring device is realized properly.

(19) A system as defined in claim 18, wherein said second measuring device includes a storage device for storing beforehand information on a relationship between frequencies of said electromagnetic waves and temperatures, and a converting device for converting into a temperature the electromagnetic waves obtained from said communication device.

According to the invention (19) above, the second measuring device is realized properly.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DETAILED DESCRIPTION OF THE INVENTION

Preferred embodiments of this invention will be described in detail hereinafter with reference to the drawings.

Embodiment 1

Figure 1:
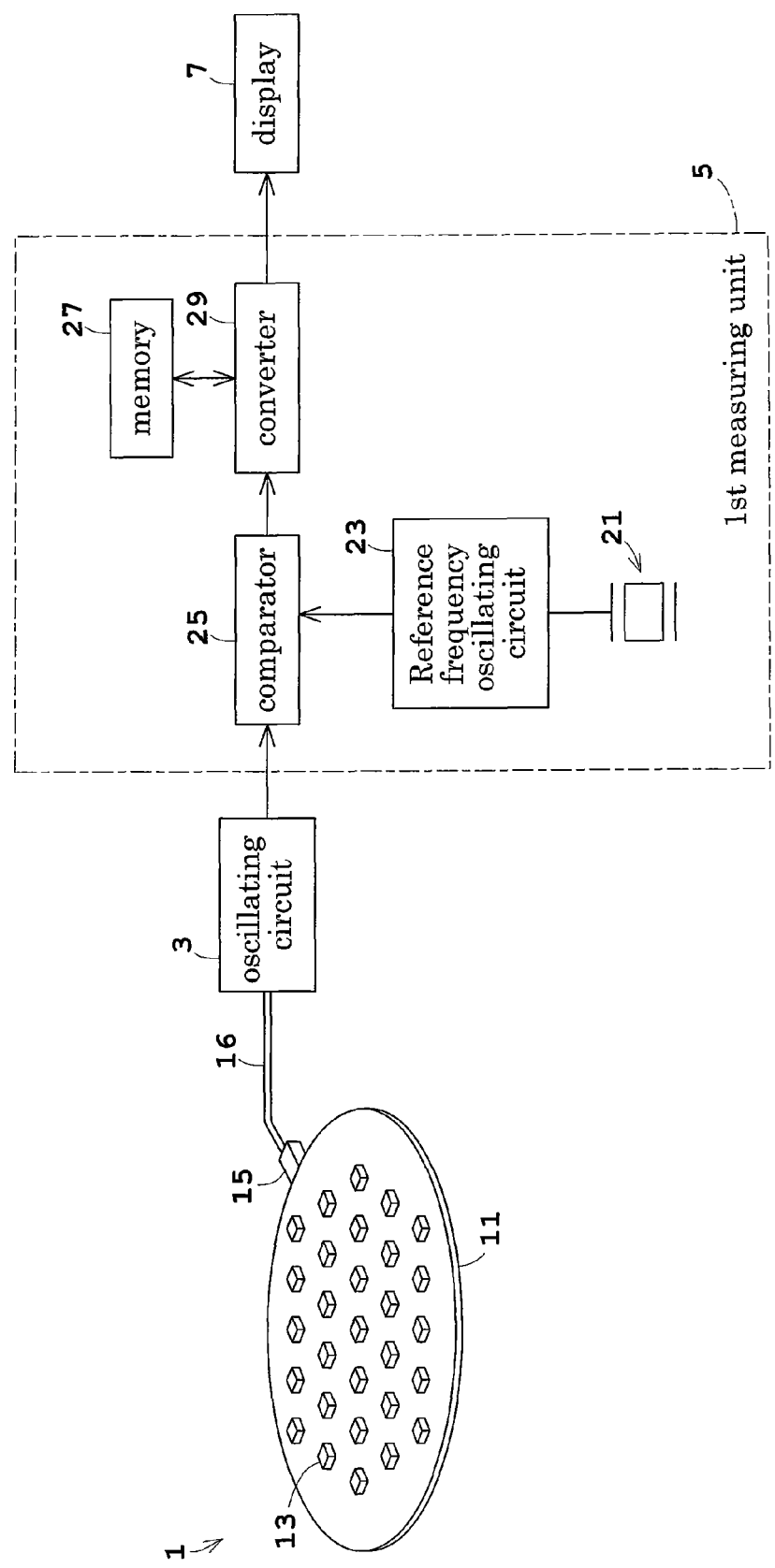
FIG. 1 is a view showing an outline of a first thermometric system in Embodiment 1.
Figure 2:
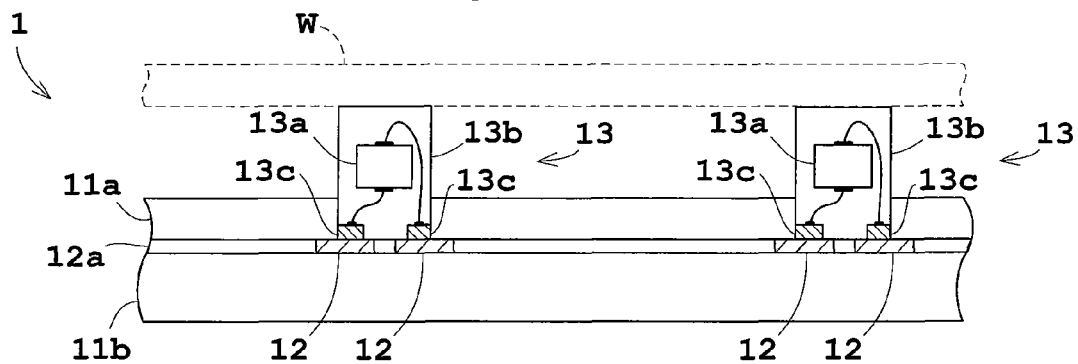
FIG. 2 is a sectional view of a principal portion of a first detecting sheet.
Figure 3:
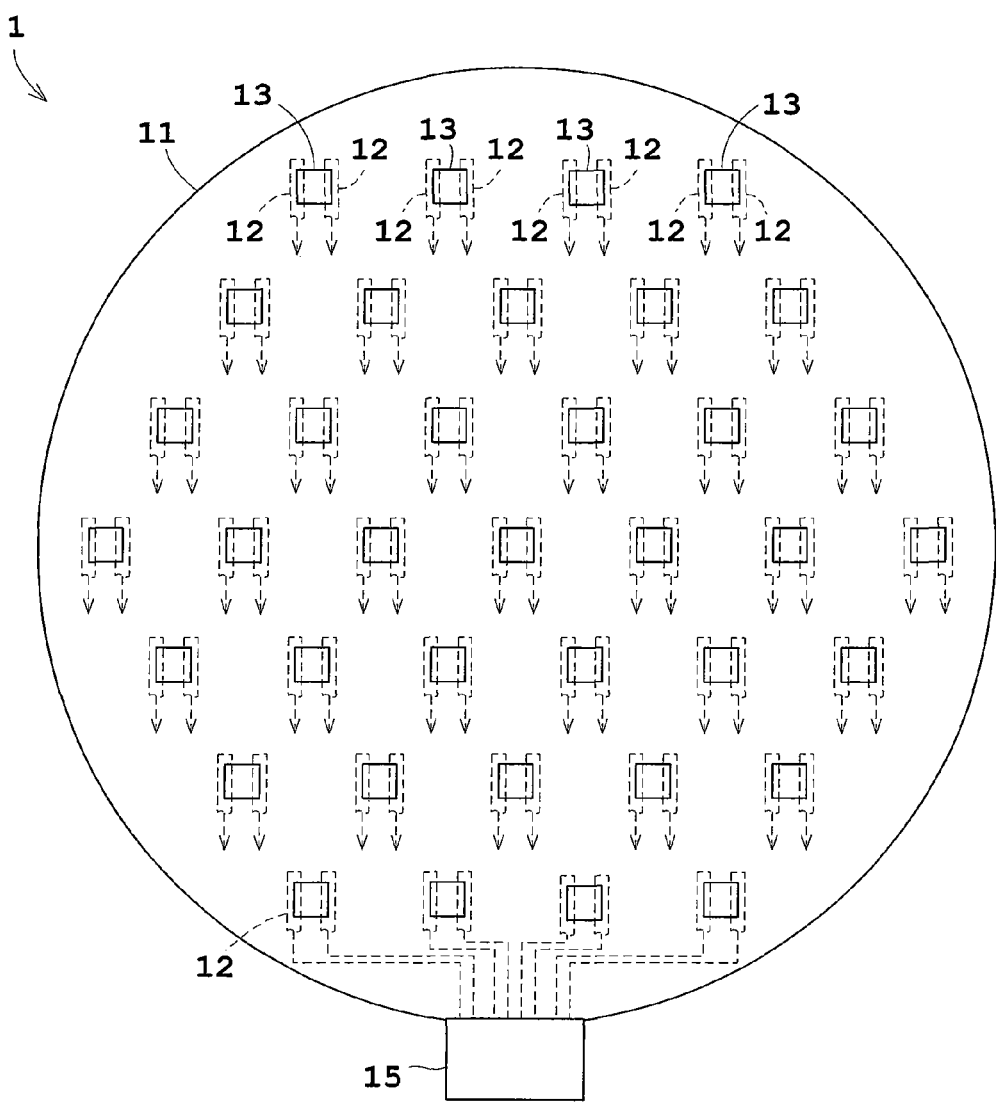
FIG. 3 is a plan view of the first detecting sheet.

FIG. 1 is a view showing an outline of a first thermometric system in Embodiment 1. FIG. 2 is a sectional view of a principal portion of a first detecting sheet. FIG. 3 is a plan view of the first detecting sheet.

The first thermometric system in Embodiment 1 is designed to measure the temperature of a wafer W acting as an object under test, and includes a first detecting sheet 1, an oscillating circuit 3, a first measuring unit 5 and a display unit 7. The first detecting sheet 1 has crystal oscillators 13 arranged on a sheet formed of resin (hereinafter referred to simply as "resin sheet") 11. The resin sheet 11 corresponds to the first sheet-like object in this invention.

The plurality of crystal oscillators 13 project from one surface of the resin sheet 11. As shown in FIG. 2, each crystal oscillator 13 has a crystal piece 13a sealed gastight in a ceramic container 13b. The crystal piece 13a is cut at appropriate angles to have an effective temperature coefficient and a natural frequency variable with temperature. The crystal piece 13a has thin film electrodes formed such as by sputtering on opposite surfaces thereof. Each thin film electrode is connected to an exterior electrode 13c formed on a lower outer surface of the crystal oscillator 13.

The resin sheet 11 is divided into an upper sheet 11a and a lower sheet 11b, and the crystal oscillators 13 are formed on the upper sheet 11a. A wiring layer 12a having wires 12 formed of copper foil is interposed between the upper sheet 11a and lower sheet 11b. The crystal oscillators 13 are embedded in, to penetrate, the upper sheet 11a to have the exterior electrodes 13c electrically connected to the wires 12. As shown in FIG. 3, the wires 12 are gathered in form of parallel connection to an output terminal 15 disposed peripherally of the first detecting sheet 1.

An example of method of fabricating this first detecting sheet 1 will be described now. The wiring layer 12a having wires 12 is formed on the upper surface of lower layer sheet 11b having flat surfaces. The upper sheet 11a having openings shaped to correspond to the outer shape of the crystal oscillators 13 is laminated on the upper surface of the wiring layer 12a. The openings of the upper sheet 11a are formed by laser punching or by etching process. Then, the crystal oscillators 13 are laid in the openings, and the exterior electrodes 13c of the crystal oscillator 13 are connected to the wires 12.

The method of fabricating the first detecting sheet 1 is not limited to the above. For example, the lower sheet 11b, wiring layer 12a and upper sheet 11a may be laminated in the stated order. Where the wires 12 are formed beforehand, recesses reaching the wiring layer 12a may be formed in the upper sheet 11a by etching.

The resin sheet 11 (i.e. upper and lower sheets 11a and 11b), preferably, is formed of a heat-resistant resin. Preferably, the resin is resistant to chemicals also. Specifically, such material may, for example, be polyimide, polytetrafluoroethylene (PTFE), polychlorotrifluoroethylene (PCTFE), polyetheretherketone (PEEK), polyphenylene sulphide (PPS), polyvinylidene fluoride (PVDF), polyethersulfone (PES), polysulfone (PSF), polyetherimide (PEI), or heat-resistant rubber materials. Further, the resin sheet 11 may be a porous material.

A cable 16 is connected to the output terminal 15, and the detecting sheet 1 and oscillating circuit 3 are connected by this cable 16. The oscillating circuit 3 outputs oscillating frequencies corresponding to the natural frequencies of the crystal oscillators 13. The first measuring unit 5 measures temperature based on the oscillating frequencies outputted from the oscillating circuit 3, and includes a reference crystal oscillator 21, a reference frequency oscillating circuit 23, a comparator 25, a memory 27 and a converter 29. The first measuring unit 5 corresponds to the first measuring device in this invention.

The reference crystal oscillator 21 is maintained at a predetermined temperature in a thermostatic oven, for example.

The reference frequency oscillating circuit 23 outputs a reference frequency corresponding to the natural frequency of the reference crystal oscillator 21. Thus, the reference crystal oscillator 21 and reference frequency oscillating circuit 23 constitute a reference signal source.

The comparator 25 compares the oscillating frequencies and reference frequency to obtain deviations of the former from the latter. The memory 27 stores information on a relationship, obtained beforehand through experiment, between deviations of the oscillating frequencies from the reference frequency and temperatures of the crystal oscillators 13. The converter 29 refers to the relationship information stored in the memory 27, and converts the deviations obtained from the comparator 25 into temperatures. The display unit 7 displays the temperatures provided by the converter 29.

The comparator 25, memory 27 and converter 29 are realized by a central processing unit (CPU) which performs various processes, a RAM (Random Access Memory) used as the workspace for operation processes, and a storage medium such as a fixed disk for storing a variety of information.

Next, operation of the first thermometric system in Embodiment 1 will be described.

As shown in FIG. 2, a wafer W (shown in a dotted line) to be tested is placed in contact with the first detecting sheet 1. At this time, the crystal oscillators 13 contact the wafer W, and provide natural frequencies corresponding to the temperature of wafer W (that is, detect the temperature of wafer W). The oscillating circuit 3 connected to the crystal oscillators 13 outputs oscillating frequencies corresponding to the natural frequencies of the crystal oscillators 13. The comparator 25 compares the outputted oscillating frequencies with the reference frequency and calculates their deviations. The converter 29 refers to the relationship information stored in the memory 27, and converts the calculated deviations into temperatures. The display unit 7 displays the temperatures converted.

Thus, according to the first thermometric system in Embodiment 1, the temperature of wafer W can be detected and measured accurately with the first detecting sheet 1 contacting the object under test (i.e. the wafer W).

The first detecting sheet 1 has the resin sheet 11 with the flexibility to change shape, thereby being capable of contacting the object under test easily. Since the first detecting sheet 1 requires no effort of attaching and detaching to/from the object under test, any desired object can be selected for testing. Furthermore, there is no possibility of metal contamination of the object under test.

The first detecting sheet 1 is constructed to have the crystal oscillators 13 projecting from the resin sheet 11. Thus, the crystal oscillators 13 can easily contact the object under test, to detect the temperature of the object under test accurately. At the same time, an area of contact with the object under test can be restricted.

Since wires 12 are formed inside the resin sheet 11 and gathered to the output terminal 15, the wires 12 can be connected conveniently to an external circuit such as the oscillating circuit 3.

The temperature of the object under test contacted by the crystal oscillators 13 can be measured appropriately by providing the oscillating circuit 3 and first measuring unit 5.

Embodiment 2

Next, Embodiment 2 of this invention will be described with reference to the drawings.

Figure 4:
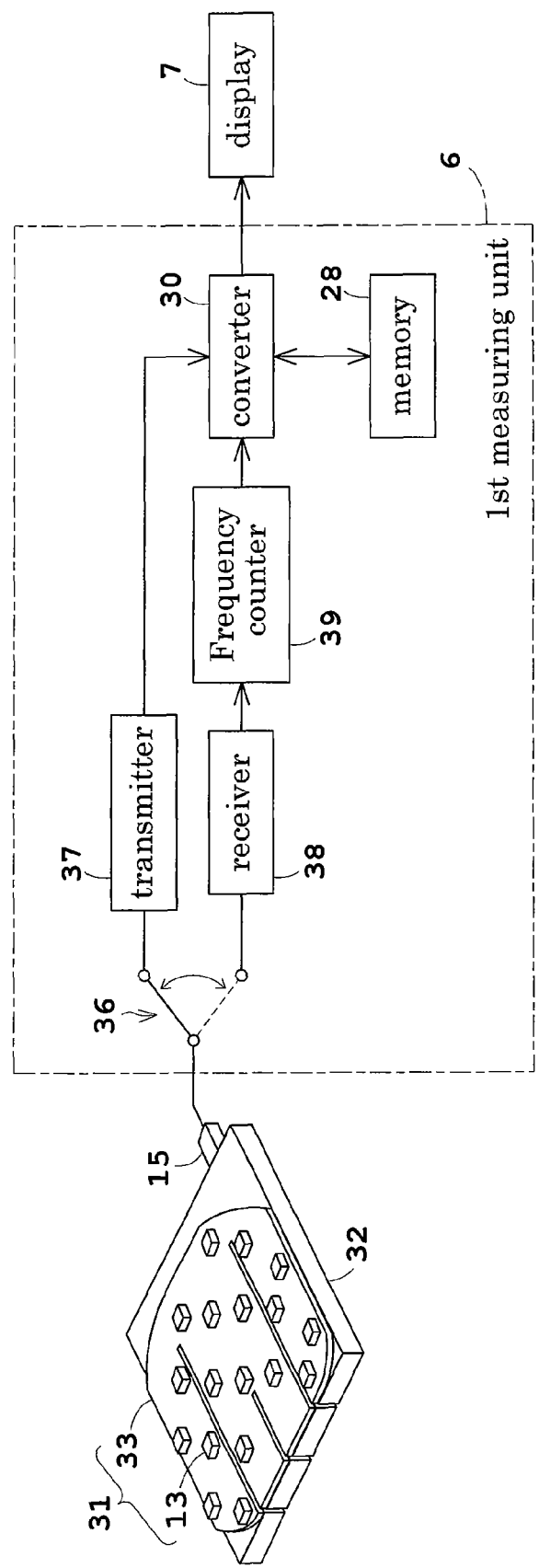
FIG. 4 is a view showing an outline of a first thermometric system in Embodiment 2.
Figure 5:
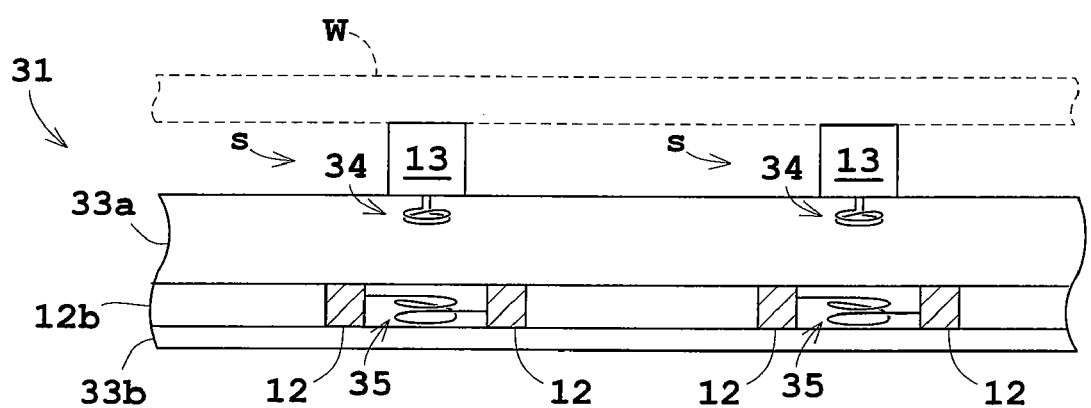
FIG. 5 is a sectional view of a principal portion of a first detecting sheet.

FIG. 4 is a view showing an outline of a first thermometric system in Embodiment 2. FIG. 5 is a sectional view of a principal portion of a first detecting sheet. Like reference numerals are used to identify like parts which are the same as in Embodiment 1 and will not particularly be described.

The first thermometric system in this embodiment measures the temperature of a wafer W acting as an object under test, and is applied to a transport mechanism which transports the wafer W. The first thermometric system has a first detecting sheet 31, a first measuring unit 6 and a display unit 7. The transport mechanism includes a holding arm 32, and a moving device (not shown) for moving the holding arm 32. The holding arm 32 is a plate-like object defining cutouts for transferring the wafer W to and from lift pins. The first detecting sheet 31 has crystal oscillators 13 arranged on one surface of a sheet formed of a resin (hereinafter referred to simply as "resin sheet") 33, and is spread over an upper surface of the holding arm 32. The resin sheet 33 corresponds to the first sheet-like object in this invention.

The first detecting sheet 31 will be described in detail with reference to FIG. 5. The resin sheet 33 is divided into an upper sheet 33a and a lower sheet 33b. The crystal oscillators 13 are formed on the upper sheet 33a. Each crystal oscillator 13 is connected to a coil 34 formed in the upper sheet 33a. These crystal oscillators 13 and coils 34 constitute thermometric elements "s".

A wiring layer 12b is interposed between the upper sheet 33a and lower sheet 33b. The wiring layer 12b has wires 12 formed of copper foil, and sensor coils 35 connected to the wires 12. The sensor coils 35 are arranged in positions opposed to the coils 34. The sensor coils 35 are set to such a posture that the axes of the sensor coils 35 and coils 34 extend in the same direction. The upper and lower sheets 33a and 33b may be formed of the material noted in Embodiment 1 for forming the upper and lower sheets 11a and 11b. Thus, the sensor coils 35 and coils 34 are separated (out of contact), and electrically insulated by the upper sheet 33a.

The sensor coils 35 are connected to the first measuring unit 6 through the wires 12 and output terminal 15. The first measuring unit 6 in this embodiment detects electromagnetic waves received by the sensor coils 35, and measures temperatures based on frequencies of the detected electromagnetic waves. The first measuring unit 6 has a switcher 36, a transmitter 37, a receiver 38, a frequency counter 39, a memory 28 and a converter 30. The first measuring unit 6 corresponds to the first measuring device in this invention.

The switcher 36 connects the transmitter 37 or receiver 38 to the sensor coils 35. When the transmitter 37 is connected to the sensor coils 35, the transmitter 37 causes the sensor coils 35 to send transmitter pulses with frequencies corresponding to the natural frequencies of the crystal oscillators 13. When the receiver 38 is connected to the sensor coils 35, the receiver 38 detects the electromagnetic waves received by the sensor coils 35. The switcher 36, transmitter 37 and receiver 38 correspond to the communication device in this invention.

The frequency counter 39 is connected to the receiver 38 for measuring the frequencies of the electromagnetic waves detected by the receiver 38. The memory 28 stores information on a relationship between the frequencies of the electromagnetic waves outputted according to damped oscillations of the thermometric elements "s" when the transmitter pulses are given (frequencies corresponding to the damped oscillations), and the temperatures of the thermometric elements "s". The relationship information is obtained beforehand through experiment. The converter 30 refers to the relationship information stored in the memory 28, and converts the frequencies obtained from the frequency counter 39 into temperatures.

Next, operation of the first thermometric system in Embodiment 2 will be described.

As shown in FIG. 4, when the holding arm 32 holds a wafer W (shown in a dotted line) which is the object under test, the first detecting sheet 31 contacts the wafer W. At this time, the crystal oscillators 13 contact the wafer W, and provide natural frequencies corresponding to the temperature of wafer W (that is, detect the temperature of wafer W).

When the switcher 36 connects the transmitter 37 to the sensor coils 35, the sensor coils 35 send the transmitter pulses with frequencies corresponding to the natural frequencies of the crystal oscillators 13. The transmitter pulses are received by the coils 34, and the crystal oscillators 13 resonate with the frequencies of the transmitter pulses.

Then, the switcher 36 switches the connection with the sensor coils 35 from the transmitter 37 to the receiver 38. The transmission from the sensor coils 35 stops, and the crystal oscillators 13 provide damped oscillations with frequencies corresponding to the temperature of wafer W. The coils 34 transmit electromagnetic waves corresponding to the damped oscillations, and the sensor coils 35 receive the electromagnetic waves. As a result, the receiver 38 detects the electromagnetic waves corresponding to the damped oscillations. The frequency counter 39 measures the frequencies corresponding to the damped oscillations. The converter 30 refers to the relationship information stored in the memory 28, converts the frequencies corresponding to the damped oscillations into temperatures, and outputs the temperatures to the display unit 7.

Thus, according to the first thermometric system in Embodiment 2 also, the temperature of wafer W can be detected and measured accurately with the first detecting sheet 1 contacting the object under test (i.e. the wafer W).

With the coils 34 and sensor coils 35 arranged as described above, the crystal oscillators 13 and wires 12 can be separated. This allows the crystal oscillators 13 to be arranged on the surface (upper surface) of the first detecting sheet 31. Thus, the temperature of wafer W which is the object under test can be detected with greater accuracy, without the crystal oscillators 13 being influenced by a temperature at the back surface (i.e. the bottom side).

Embodiment 3

Figure 6:
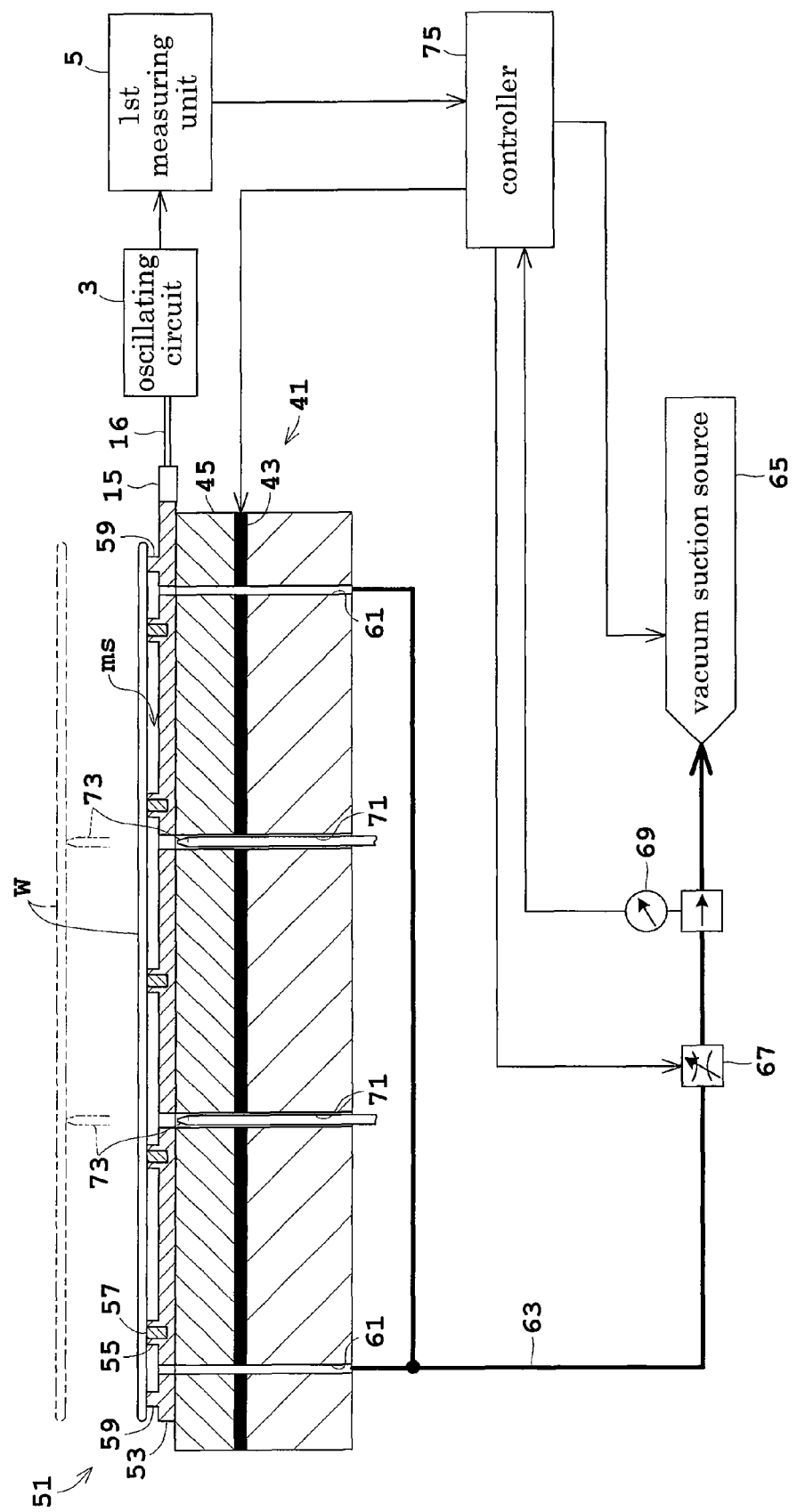
FIG. 6 is a view in vertical section showing an outline of a heat treatment apparatus in Embodiment 3.
Figure 7:
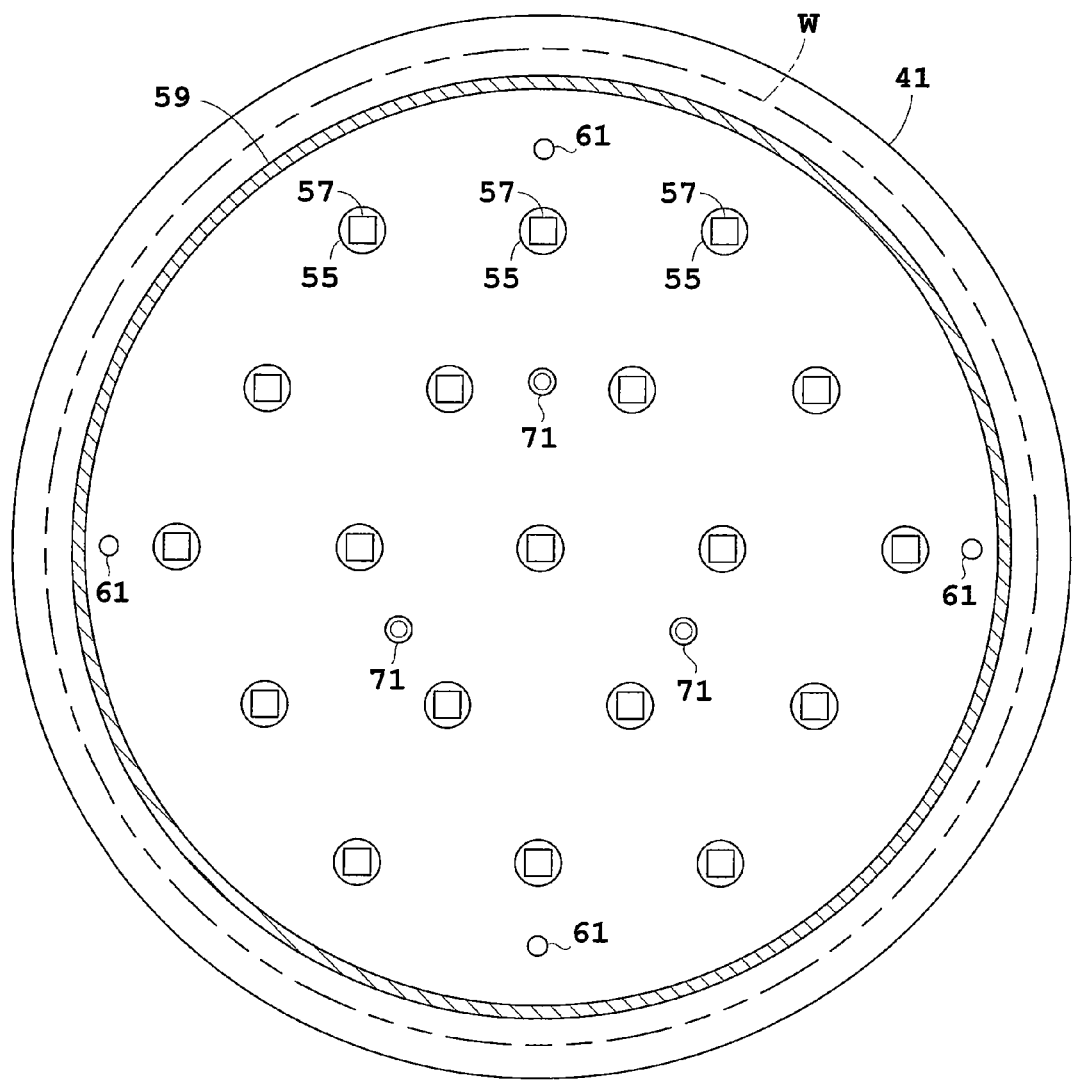
FIG. 7 is a plan view of a heat-treating plate.
Figure 8:
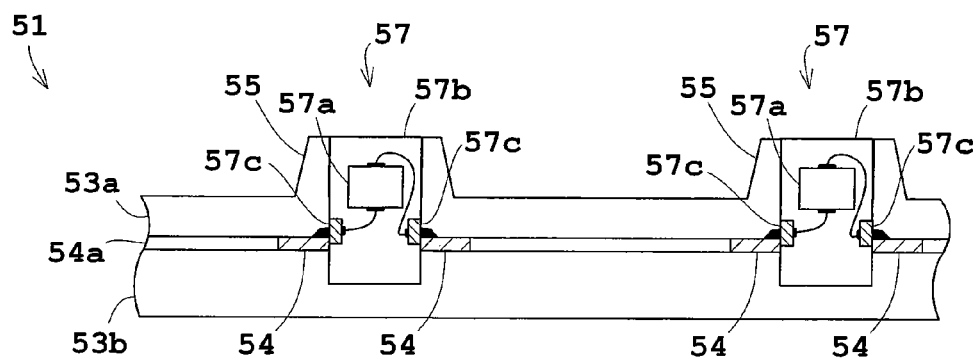
FIG. 8 is a sectional view of a principal portion of a first detecting sheet.

FIG. 6 is a view in vertical section showing an outline of a heat treatment apparatus in Embodiment 3. FIG. 7 is a plan view of a heat-treating plate. FIG. 8 is a sectional view of a principal portion of a first detecting sheet. Like reference numerals are used to identify like parts which are the same as in Embodiment 1 and will not particularly be described.

A heat-treating plate 41 is circular and has a slightly larger diameter than a wafer W in plan view. The upper surface of the plate 41 is flat. The heat-treating plate 41 is formed of a metal such as copper or aluminum having high thermal conductivity, for example. The heat-treating plate 41 has a heating element 43 such as a mica heater mounted therein. A heat transfer portion 45 between the heating element 43 and the upper surface of heat-treating plate 41 has a plurality of heat pipes, not shown, embedded therein. Cooling grooves, not shown, are formed between the heat pipes for circulating a cooling fluid.

A first detecting sheet 51 is laid to cover the upper surface of the heat-treating plate 41. The first detecting sheet 51 in Embodiment 3 has a plurality of projections 55 formed on the upper surface of a sheet of a heat-resistant resin (hereinafter referred to as "heat-resistant resin sheet") 53 for contacting and supporting the wafer W. Crystal oscillators 57 are mounted in the projections 55. The first detecting sheet 51 is placed in a predetermined position without being fixed to the heat-treating plate 41. The heat-resistant resin sheet 53 corresponds to the first sheet-like object in this invention.

As shown in the drawings, the projections 55 are arranged regularly. Each projection 55 is pillar-shaped to rise from the surrounding area, with a diameter slightly enlarging from the upper end to the lower end. Each projection 55 is recessed substantially centrally thereof to a depth corresponding to a height of crystal oscillator 57, and one of the crystal oscillators 57 is fitted in this recess.

As shown in FIG. 8, the heat-resistant resin sheet 53 is divided into an upper sheet 53a and a lower sheet 53b, between which a wiring layer 54a having wires 54 is interposed. Depending on the height of crystal oscillators 57, as illustrated, the crystal oscillators 57 may be embedded deep in the heat-resistant resin sheet 53 so that the lower ends of crystal oscillators 57 may penetrate the wiring layer 54a and reach the lower sheet 53b. In such a case, each crystal oscillator 57 may include exterior electrodes 57c formed laterally of a ceramic container 57b and electrically connected to the wires 54. Each crystal piece housed in the container 57b is indicated by reference 57a.

The first detecting sheet 51 further includes a sealer 59 for contacting edge regions of the wafer W. The sealer 59 is ring-shaped, and has a diameter slightly smaller than the outside diameter of the wafer W in plan view, and a height equal to that of the projections 55. The sealer 59 contacts the wafer W to close lateral areas of a space formed between the first detecting sheet 51 and the wafer W (hereinafter referred to as "minute space "ms""). The sealer 59 corresponds to the closing device in this invention.

Such first detecting sheet 51 is formed by etching process or laser punching as described in Embodiment 1. The upper and lower sheets 53a and 53b may be formed of the material noted in Embodiment 1 for forming the upper and lower sheets 11a and 11b. The above first detecting sheet 51, oscillating circuit 3 and first measuring unit 5 constitute the first thermometric system in this invention.

In this embodiment, exhaust bores 61 and perforations 71 extend through the heat-treating plate 41 and first detecting sheet 51.

The exhaust bores 61 are formed for exhausting gas from the minute space "ms". The number of exhaust bores 61 is plural (four), One end of exhaust piping 63 is connected commonly to the exhaust bores 61 adjacent the lower surface of the heat-treating plate 41. A vacuum suction source 65 is connected to the other end of the exhaust piping 63. This vacuum suction source 63 is a vacuum utility provided for a cleanroom, for example. The exhaust piping 63 has a switch valve 67 for regulating pressure (negative pressure), and a pressure gauge 69 for measuring the pressure. The exhaust piping 63 and vacuum suction source 65 function as an exhaust device.

The number of perforations 71 is three, and each perforation 71 has a lift pin 73 extending therethrough. The lift pins 73 have lower ends thereof connected to a lift mechanism, not shown, for vertically moving the lift pins 73. The lift pins 73 are vertically movable by the lift mechanism to transfer the wafer W to and from a transport device not shown.

A controller 75 performs an overall control of the apparatus, i.e. controls output of the heating element 43 noted hereinbefore, switching operation of the switch valve 67, and operation of the lift mechanism. These controls are performed based on a recipe stored beforehand. The output of the heating element 43 is adjusted appropriately by referring to temperatures obtained from the first measuring unit 5. The controller 75 refers to results of detection by the pressure gauge 69 for controlling the switching operation of the switch valve 67. The controller 75 is realized by a central processing unit (CPU) which performs various processes, a RAM (Random Access Memory) used as the workspace for operation processes, and a storage medium such as a fixed disk for storing a variety of information.

Figure 9:
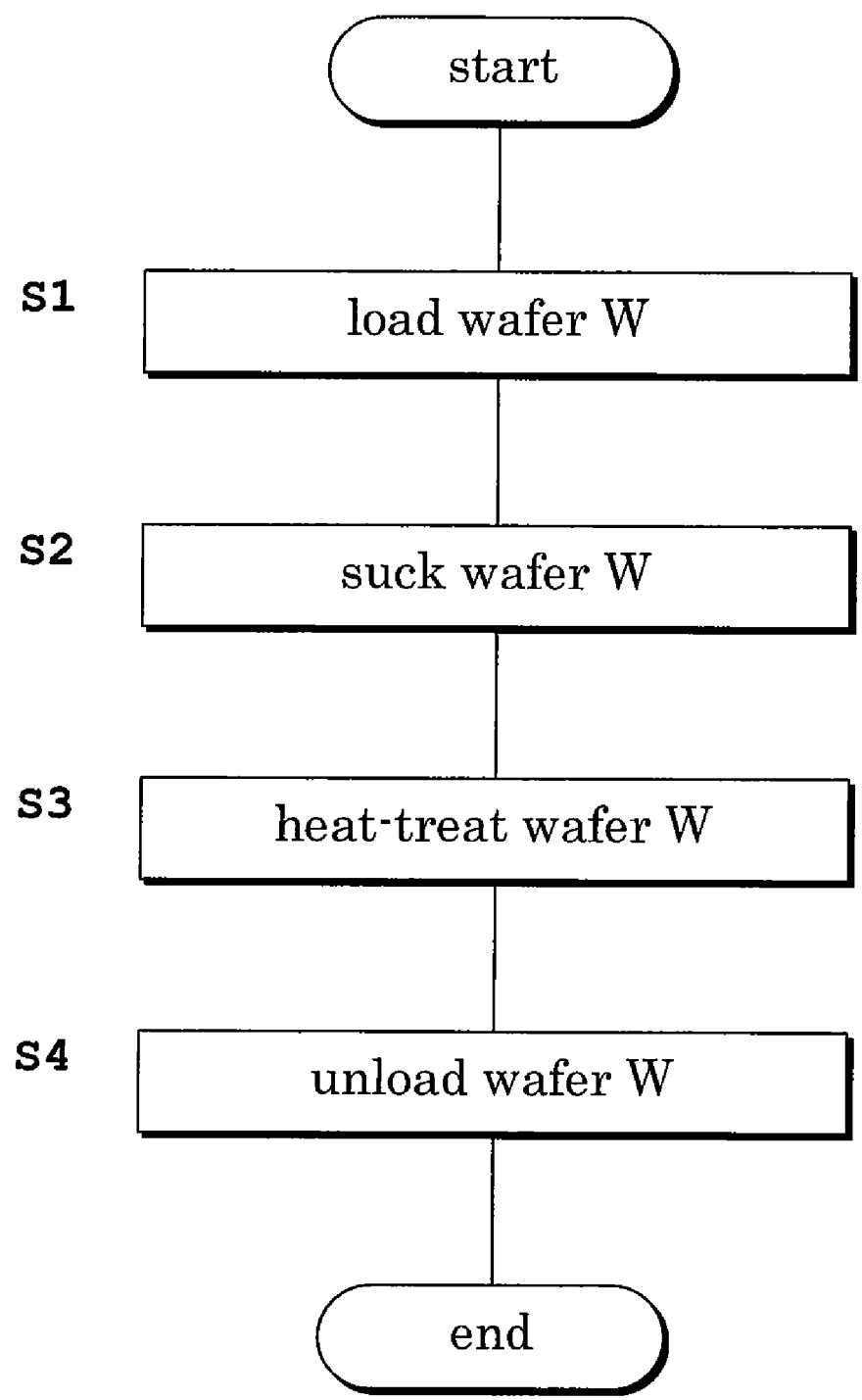
FIG. 9 is a flow chart showing a procedure of heat-treating a substrate.

Operation of the substrate heat treatment apparatus in Embodiment 3 will be described next. FIG. 9 is a flow chart illustrating a procedure of heat-treating a wafer W. The temperature control of the heating element 43 is assumed to have already been carried out according to the recipe, and will be omitted from the following description.

<Step S1> Load Wafer W

The controller 75 operates the lift mechanism (not shown) to raise the lift pins 73 and receive a wafer W from the transport device not shown. Then, the lift pins 73 are lowered to place the wafer W on the first detecting sheet 51. At this time, the projections 55, crystal oscillators 57 and sealer 59 contact the lower surface of the wafer W. As a result, a closed minute space "ms" is formed between the wafer W and first detecting sheet 51. The crystal oscillators 57 detect the temperature of the wafer W, The first measuring unit 5 converts frequencies corresponding to the natural frequencies of crystal oscillators 57 into temperatures.

<Step S2> Suck Wafer W

The controller 75 opens the switch valve 67 to exhaust the gas (i.e. air or nitrogen) from the minute space "ms" through the exhaust bores 61. The pressure in the minute space "ms" is adjusted to a negative pressure, whereby the wafer W is sucked toward the heat-treating plate 41.

<Step S3> Heat-Treat Wafer W

A predetermined heat treatment is carried out for the wafer W while maintaining the wafer W in the suction-supported state for a predetermined time. At this time, the controller 75 refers to the temperature of the wafer W obtained from the first measuring unit 5 as appropriate, and adjusts the output of the heating element 43 to control the temperature of the wafer W.

<Step S4> Unload Wafer W

Upon completion of the heat treatment performed for the predetermined time, the controller 75 closes the switch valve 67 to return the pressure in the minute space "ms" to atmospheric pressure. Then, the lift pins 73 are raised to move the wafer W upward and transfer the wafer W to the transport device not shown.

Thus, according to this embodiment, the first detecting sheet 51 with the crystal oscillators 57 mounted in the projections 55 can detect the temperature of the wafer W accurately while restricting an area of contact with the wafer W. With the crystal oscillators 57 embedded deep in the heat-resistant resin sheet 53, the height of the first detecting sheet 51 as a whole can be reduced. Thus, the wafer W can be heat-treated as placed close to the upper surface of the heat-treating plate 41.

The heat-resistant resin sheet 53 allows the temperature of the wafer W to be measured accurately even when the wafer W has a high temperature. Furthermore, there is no possibility of metal contamination of the wafer W. By suction-supporting the wafer W, heat treatment can be performed uniformly over the surface of the wafer W. Even when variations occur in temperature over the surface of heat-treating plate 41, the first detecting sheet 51 transmits the temperature to the wafer W while absorbing the variations. This inhibits variations in heat history over the surface of the wafer W.

Figure 10:
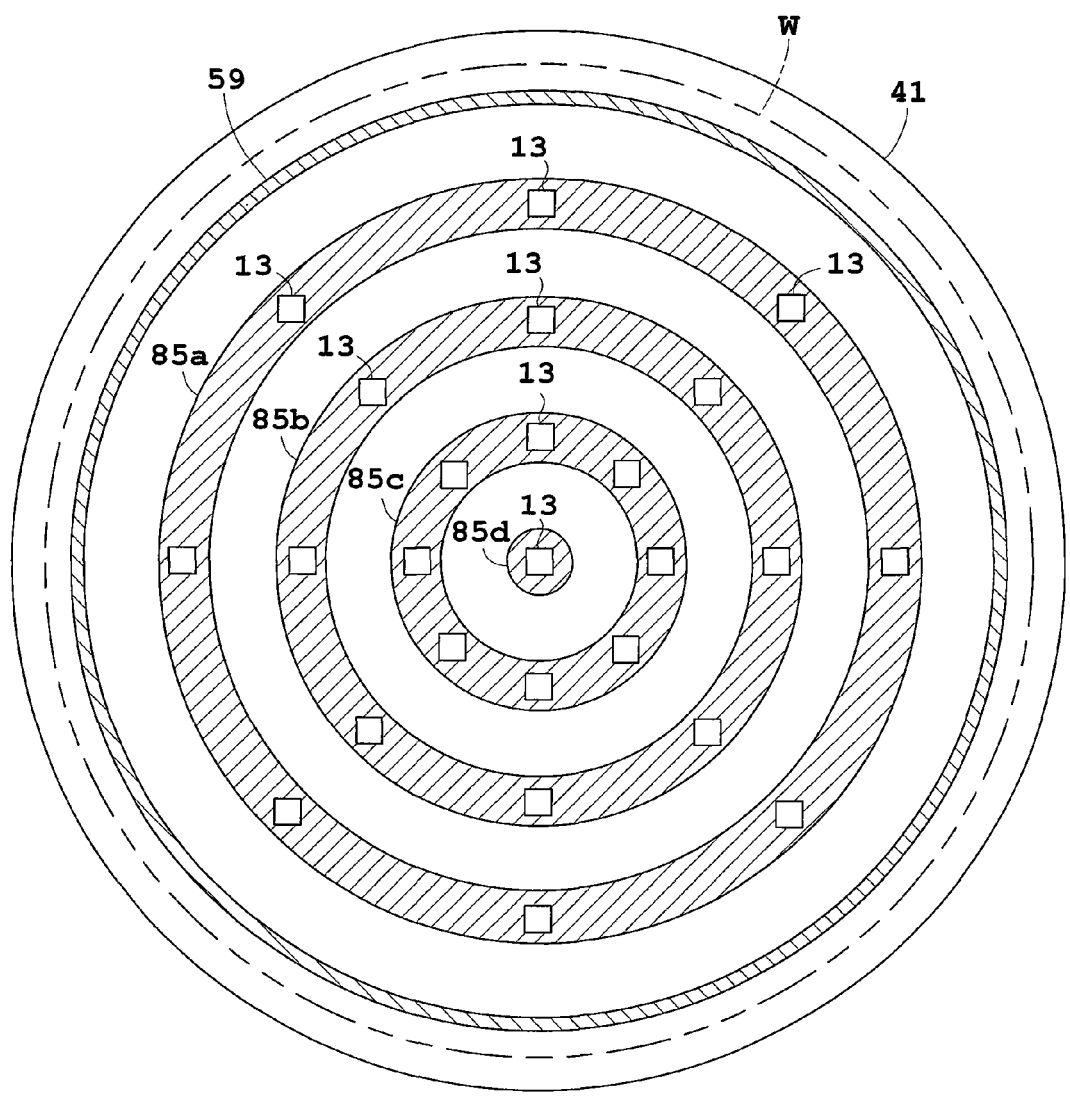
FIG. 10 is a plan view of a modified first detecting sheet.
Figure 11:
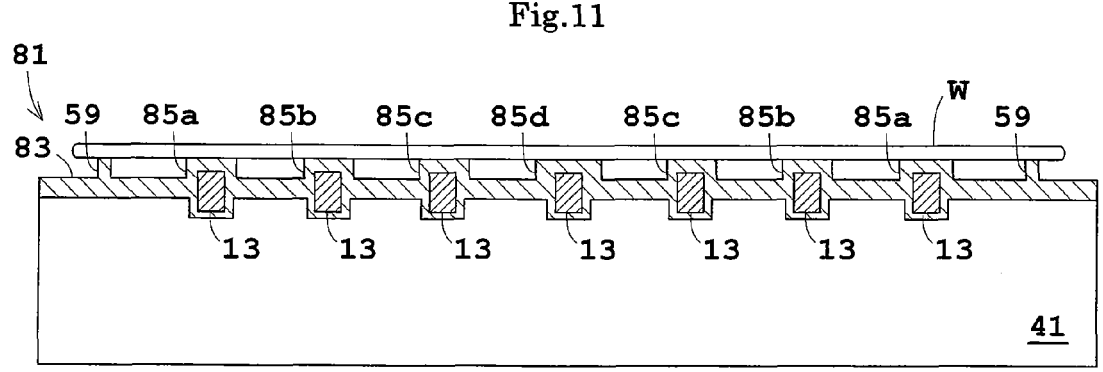
FIG. 11 is a sectional view of the modified first detecting sheet.

This invention is not limited to the foregoing embodiments, but may be modified as follows:

(1) In Embodiment 3 described above, the first detecting sheet 51 has the projections 55 arranged separately from one another in dots. The invention is not limited to such arrangement. Reference is made to FIGS. 10 and 11. FIG. 10 is a plan view of a modified first detecting sheet 81. FIG. 11 is a sectional view of the modified first detecting sheet 81. The first detecting sheet 81 shown in FIG. 10 has four ring-shaped projections 85a, 85b, 85c and 85d having different diameters formed on a resin sheet 83. The projections 85a-85d are arranged in concentric circles. Crystal oscillators 13 are mounted in various positions of the projections 85a-85d. With such first detecting sheet 81, the temperature of an object under test such as wafer W can be measured conveniently. The resin sheet 83 corresponds to the first sheet-like object in this invention.

The first detecting sheet may be constructed without the projections 55 formed on the resin sheet and without the crystal oscillators 13 projecting from the resin sheet. Specifically, the modified detecting sheet may use a resin sheet with a flat surface like the upper sheet 11a described in Embodiment 1, and have crystal oscillators mounted in the resin sheet or embedded therein so that the upper end surfaces of the crystal oscillators may be at the same height as the surface of the resin sheet. With such first detecting sheet, the entire surface of the first detecting sheet can contact the object under test.

(2) In each of Embodiments 1-3 described above, the upper ends of crystal oscillators 13 or 57 are exposed from the resin sheet 11 or 33 or the heat-resistant resin sheet 53. The invention is not limited to this arrangement. As shown in FIG. 11, for example, the entire crystal oscillators 13 may be contained in the resin sheet 83. This modification allows only the resin sheet 83 to contact the object under test, thereby further inhibiting contamination of the object under test.

(3) In each of Embodiments 1-3 described above, the first detecting sheet 1, 31 or 51 has the resin sheet 11 or 33 and the heat-resistant resin sheet 53 shaped (e.g. circular) to cover the entire back surface of the object under test (e.g. wafer W) from below. The invention is not limited to this construction. For example, the first detecting sheet may be shaped to follow wires 12 or 54, with an upper sheet and a lower sheet formed of a resin or a heat-resistant resin and covering only the parts along the wires 12 or 54 extending from the crystal oscillators 13 or 57 to the output terminal 15.

(4) In Embodiment 3 described above, the upper surface of heat-treating plate 41 is flat. The invention is not limited to this. As shown in FIG. 11, for example, channel-like grooves may be formed in the upper surface of heat-treating plate 41, with the crystal oscillators 57 embedded in these grooves. In this case, as shown in FIG. 11, the bottom shape of heat-resistant resin sheet 53 may be modified so that the heat-resistant resin sheet 53 may also be fitted in the grooves. Or the crystal oscillators 57 may penetrate the heat-resistant resin sheet 53 so that only the crystal oscillator 57 may be fitted in the grooves. Thus, regardless of the height of crystal oscillators 57, the distance between the wafer W and heat-treating plate 41 can be shortened.

(5) In Embodiment 2 described above, the first detecting sheet 31 and first thermometric system are applied to the transport mechanism. A transport path may be selected as appropriate. For example, the transport path may be from an indexer unit to a heat-treating section, from a resist coating section to a developing section, or between any other treating sections. In Embodiment 3, the first detecting sheet 51 and first thermometric system are applied to the heat treatment apparatus. The invention is not limited to this application. The first detecting sheet and first thermometric system may be installed, for example, on a support table used for transferring a wafer W or temporarily storing a wafer W. Further, the first detecting sheet and first thermometric system are applicable to a resist coating apparatus, a developing apparatus, a cleaning apparatus, an exposing machine, an etcher, a film forming apparatus (CVP), an apparatus for inspecting film thickness or line width, a cool plate which is one of heat treatment apparatuses, and substrate treating apparatus for performing other treatments.

(6) In each of Embodiments 1-3 described above, the containers 13b or 57b of crystal oscillators 13 or 57 are formed of ceramics. The invention is not limited to this material. Depending on the object under test, the material may be changed to a metal as appropriate.

(7) In Embodiment 2 described above, coils 34 are connected to the crystal oscillators 13, respectively. The coils 34 may be replaced with antennas of various constructions.

(8) In each of Embodiments 1-3 described above, the oscillating circuit 3 is provided separately from the crystal oscillators 13 or 57. The invention is not limited to this arrangement. For example, oscillating circuits 3 may be mounted in the containers 13b or 57b of crystal oscillators 13 or 57.

(9) In each of Embodiments 1-3 described above, the wafer W is shown as an example of object under test. Instead, any other object may be selected as an object under test.

Embodiment 4

Next, Embodiment 4 of this invention will be described with reference to the drawings.

Figure 12:
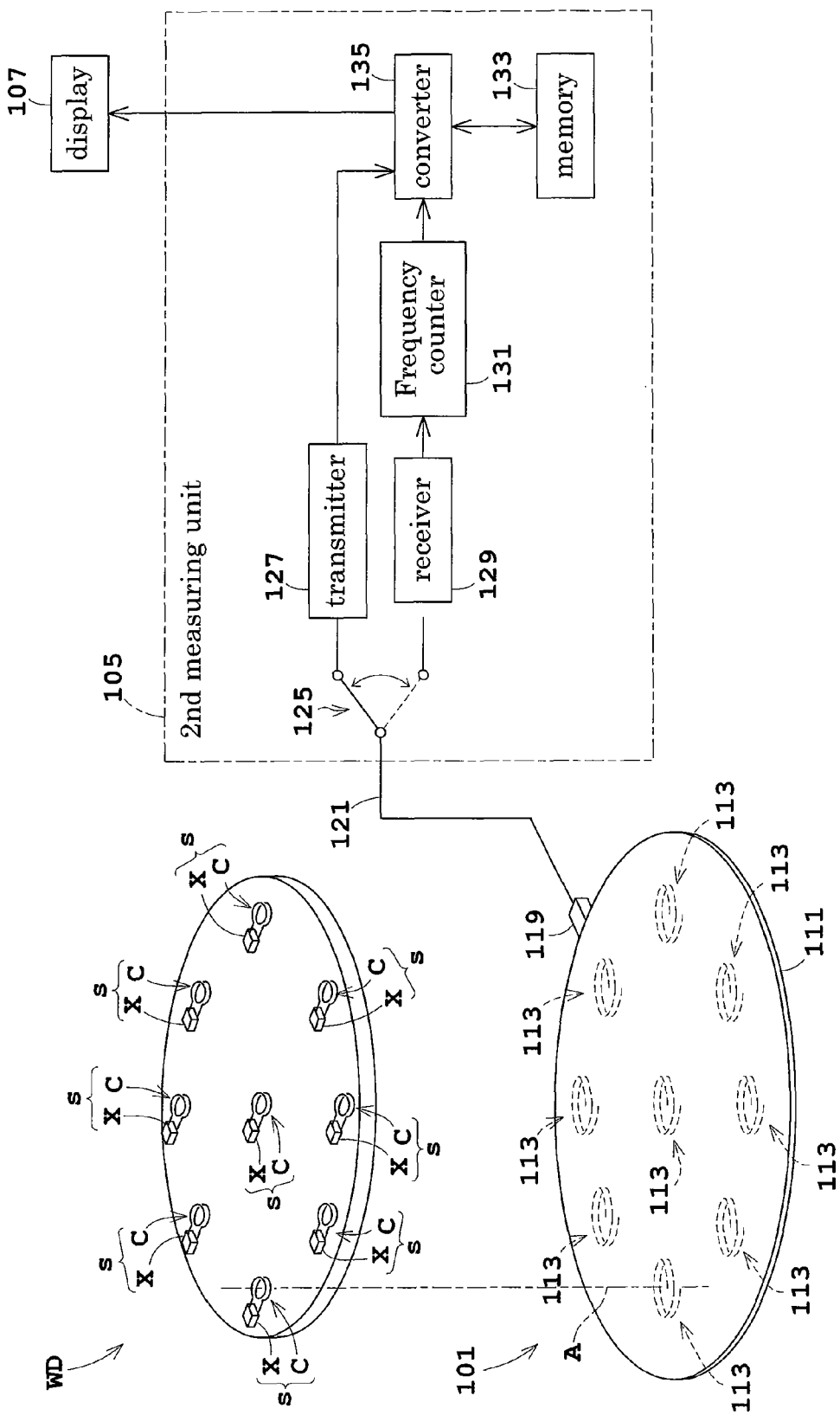
FIG. 12 is a view showing an outline of a second thermometric system in Embodiment 4.
Figure 13:
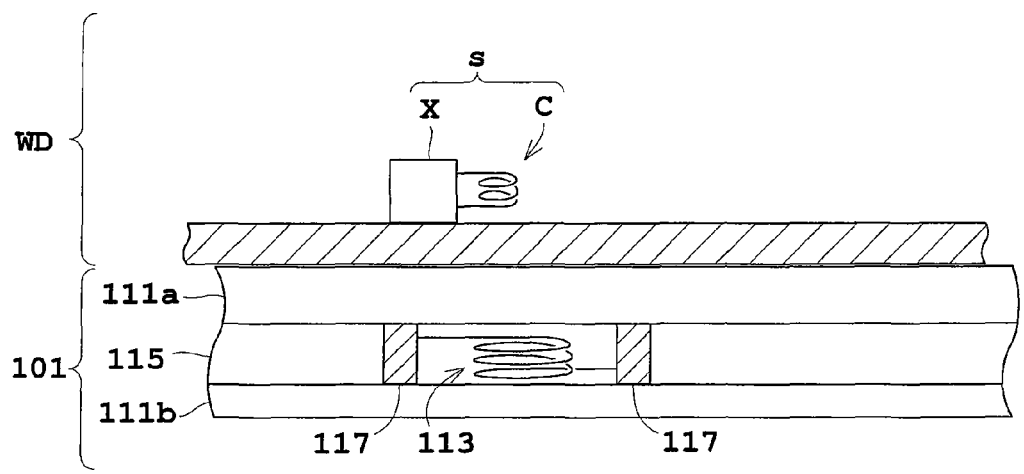
FIG. 13 is a sectional view of a principal portion of a second detecting sheet.
Figure 14:
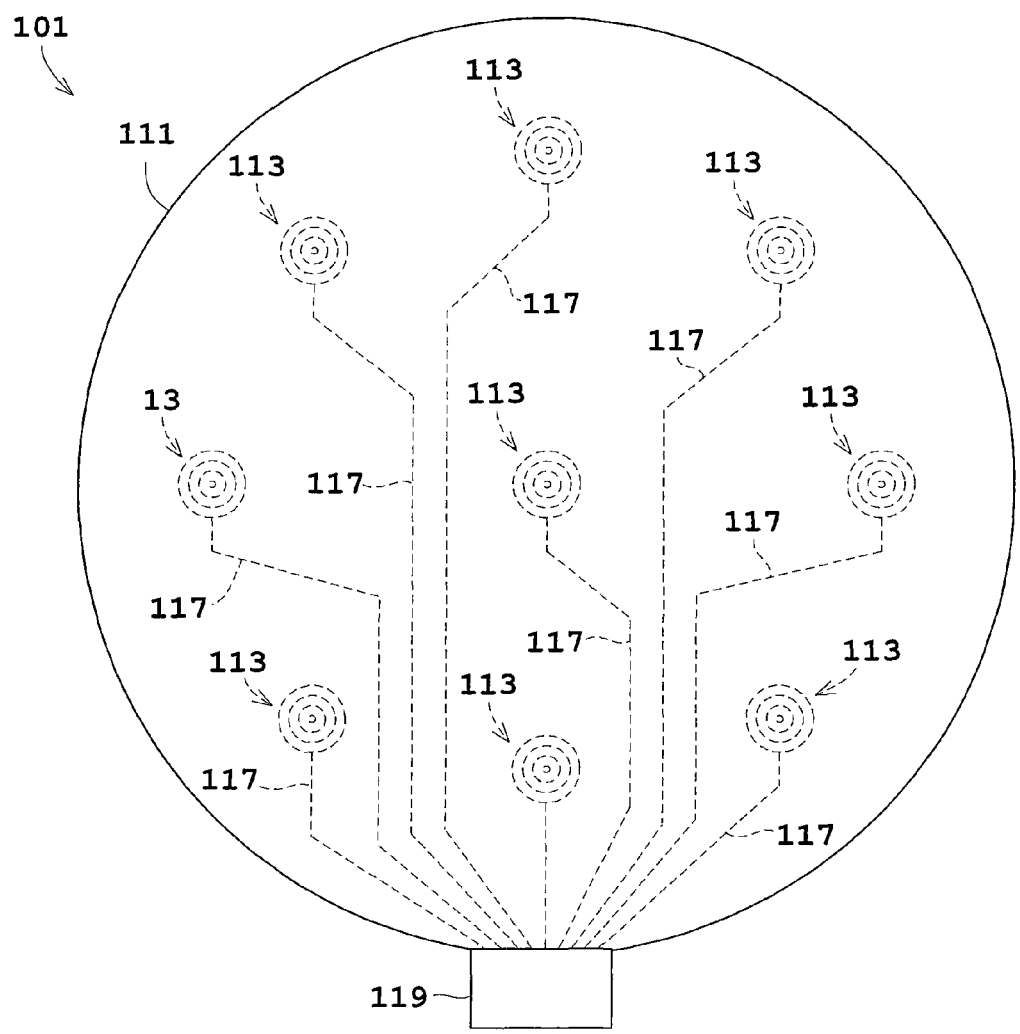
FIG. 14 is a plan view of the second detecting sheet.

FIG. 12 is a view showing an outline of a second thermometric system in Embodiment 4. FIG. 13 is a sectional view of a principal portion of a second detecting sheet. FIG. 14 is a plan view of the second detecting sheet.

The second thermometric system in this embodiment is designed to measure the temperature of a dummy wafer WD, and includes a second detecting sheet 101, a second measuring unit 105 and a display unit 107.

The dummy wafer WD has a plurality of crystal oscillators X attached thereto. Each crystal oscillator X has a crystal piece (not shown) sealed gastight in a ceramic container (not shown). The crystal piece is cut at appropriate angles to have an effective temperature coefficient and a natural frequency variable with temperature. Each crystal oscillator X has a coil C connected thereto. Each coil C is attached to the dummy wafer WD to have an axis extending substantially perpendicular to the surface of dummy wafer WD. A pair of crystal oscillator X and coil C constitute one thermometric element "s".

The second detecting sheet 101 has sensor coils 113 arranged inside a sheet formed of resin (hereinafter referred to simply as "resin sheet") 111. The second detecting sheet 101 directly contacts the dummy wafer WD to detect the temperature of the dummy wafer WD.

As shown in FIG. 13, the resin sheet 111 is divided into an upper sheet 111a and a lower sheet 111b. The dummy wafer WD is placed on a flat upper surface of the upper sheet 111a. A wiring layer 115 is interposed between the upper sheet 111a and lower sheet 111b. The wiring layer 115 has the sensor coils 113 and wires 117 formed therein.

The sensor coils 113 are arranged in positions to be opposed to the thermometric elements "s" when the dummy wafer WD is placed in a predetermined position on the second detecting sheet 101. More particularly, the sensor coils 113 are arranged in positions to be opposed to the coils C. Preferably, each sensor coil 113 has an axis extending in the same direction as the axis of the opposed coil C (FIG. 12 shows the axis of one sensor coil 113 in an alternate long and short dash line referenced A). In this embodiment, the sensor coils 113 are arranged to have the axes thereof extending substantially perpendicular to the upper surface of the upper sheet 111a. The sensor coils 113 may, for example, be air-core coils, printed coils in form of loops having a ½ to 1 turn, or helical printed coils.

The wires 117 are connected to the respective sensor coils 113. As shown in FIG. 14, the wires 117 are gathered in form of parallel connection to an output terminal 119 disposed peripherally of the second detecting sheet 101. The wires 117 are formed of copper foil, for example.

The resin sheet 111 (i.e. upper and lower sheets 111a and 111b), preferably, is formed of a heat-resistant resin. Preferably, the resin is resistant to chemicals also. Specifically, such material may, for example, be polyimide, polytetrafluoroethylene (PTFE), polychlorotrifluoroethylene (PCTFE), polyetheretherketone (PEEK), polyphenylene sulphide (PPS), polyvinylidene fluoride (PVDF), polyethersulfone (PES), polysulfone (PSF), polyetherimide (PEI), or heat-resistant rubber materials. Further, the resin sheet 111 may be a porous material. The resin sheet 111 corresponds to the second sheet-like object in this invention.

By constructing the second detecting sheet 101 as described above, the thickness of the entire second detecting sheet 101 may be reduced to a range of hundreds of micrometers to tens of micrometers. However, the thickness of the second detecting sheet 101 is not limited to this range. A thickness exceeding this range can be selected as appropriate.

A cable 121 is connected to the output terminal 119 of the second detecting sheet 101. The other end of the cable 121 is connected to the second measuring unit 105.

The second measuring unit 105 measures temperature based on frequencies of electromagnetic waves received by the sensor coils 113. The second measuring unit 105 has a switcher 125, a transmitter 127, a receiver 129, a frequency counter 131, a memory 133 and a converter 135. The second measuring unit 105 corresponds to the second measuring device in this invention.

The switcher 121 is operable to connect the transmitter 127 or receiver 129 to the cable 121. The transmitter 127 causes the sensor coils 113 to send transmitter pulses with frequencies corresponding to the natural frequencies of the crystal oscillators X. The receiver 129 detects the electromagnetic waves received by the sensor coils 113. The switcher 125, transmitter 127 and receiver 129 correspond to the communication device in this invention.

The frequency counter 131 is connected to the receiver 129 for measuring the frequencies of the electromagnetic waves detected by the receiver 129. The memory 133 stores information on a relationship between the frequencies of the electromagnetic waves outputted according to damped oscillations of the crystal oscillators X after the transmitter pulses are given (frequencies corresponding to the damped oscillations), and the temperatures of the crystal oscillators X. The relationship information is obtained through experiment. The converter 135 refers to the relationship information stored in the memory 133, and converts the frequencies obtained from the frequency counter 131 into temperatures. The display unit 107 displays the temperatures obtained by the converter 135.

The frequency counter 131, memory 133 and converter 135 are realized by a central processing unit (CPU) which performs various processes, a RAM (Random Access Memory) used as the workspace for operation processes, and a storage medium such as a fixed disk for storing a variety of information.

Next, operation of the second thermometric system in Embodiment 4 will be described.

When a dummy wafer WD is placed on the upper surface of the second detecting sheet 101 as shown in FIG. 13, the sensor coils 113 and coils C are in an opposed positional relationship, respectively, and lie close to each other at a distance approximately corresponding to the thickness of the upper sheet 111a.

When the switcher 125 connects the transmitter 127 to the sensor coils 113, the sensor coils 35 send the transmitter pulses with frequencies corresponding to the natural frequencies of the crystal oscillators X. The transmitter pulses are received by the coils C, and the crystal oscillators X connected to the coils C resonate with the frequencies of the transmitter pulses.

Then, as the switcher 125 switches to connect the receiver 129 to the sensor coils 113, the transmission from the sensor coils 113 stops. Consequently, the crystal oscillators X provide damped oscillations with frequencies corresponding to the temperature of dummy wafer WD. The coils C connected to the crystal oscillators X transmit electromagnetic waves corresponding to the damped oscillations, and the sensor coils 113 opposed to the coils C receive the electromagnetic waves.

The receiver 129 detects the electromagnetic waves received by the sensor coils 113. The frequency counter 131 measures the frequencies of the electromagnetic waves detected by the receiver 129. The converter 135 refers to the relationship information stored in the memory 133, converts the frequencies measured by the frequency counter 131 into temperatures, and outputs the temperatures to the display unit 107.

According to the second thermometric system in Embodiment 4 as described above, the sensor coils 113 arranged in the resin sheet 111 can be brought sufficiently close to the thermometric elements "s" of the dummy wafer WD, i.e. to a distance approximately corresponding to the thickness of the upper sheet 111a. This allows information to be transmitted and received with sufficient sensitivity without wires between the sensor coils 113 and coils C which are mutually out of contact. The second detecting sheet 101 can therefore accurately detect electromagnetic waves corresponding to the damped oscillations of the crystal oscillators X. The second measuring unit 105 can accurately measure the temperature of dummy wafer WD.

Even if the coils C are arranged at short intervals, those coils C not opposed to the sensor coils 113 deviate to large extents from the axes of sensor coils 113. It is therefore possible to inhibit a false detection caused by the sensor coils 113 receiving electromagnetic waves from the coils C not opposed thereto. Thus, where the dummy wafer WD has an increased number of thermometric elements "s" arranged at short intervals, temperature may be acquired from an increased number of locations on the dummy wafer WD while maintaining the accuracy of detection and measurement.

Compared, for example, with the conventional construction having sensor coils arranged in a chamber, this embodiment can place the thermometric elements "s" and sensor coils 113 markedly close to each other. This arrangement can drastically improve the accuracy of measurement, and can also greatly increase measuring locations.

The second detecting sheet 101 is formed of the resin sheet 111, and the sensor coils 113 are arranged in the resin sheet 111. Thus, there is no possibility of metal contamination of the dummy wafer WD. It is therefore possible to place a substrate on the second detecting sheet 101 for ordinary treatment. The dummy wafer WD may be used only at a time of starting or maintaining the apparatus, and substrates may be loaded into the apparatus at ordinary times for providing a predetermined treatment.

The wires 117 are formed inside the resin sheet 111 and are gathered to the output terminal 119. Thus, the wires 117 are conveniently connectable to an external circuit such as the second measuring unit 105 provided separately from the second detecting sheet 101.

Embodiment 5

Figure 15:
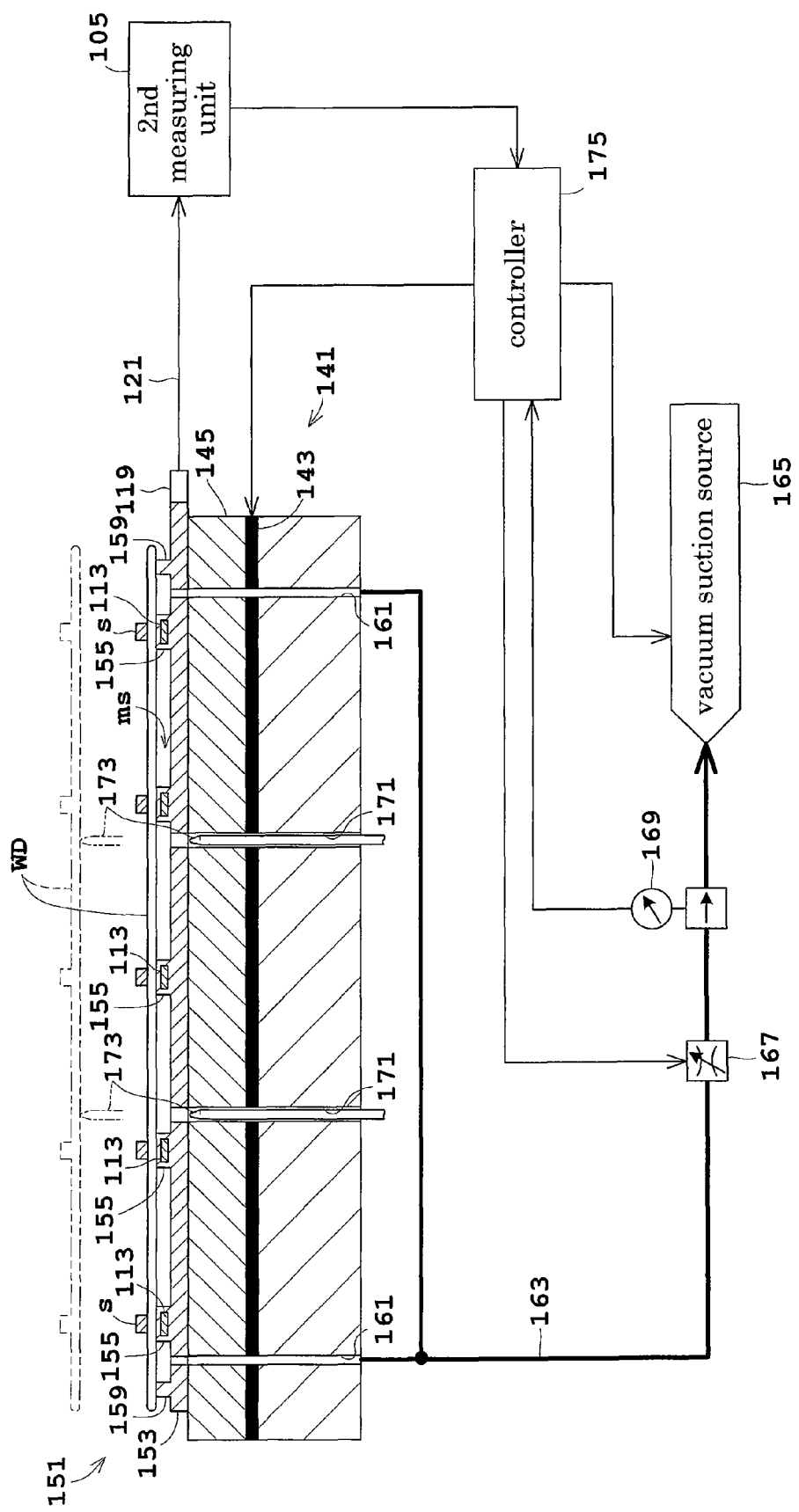
FIG. 15 is a view showing an outline of a heat treatment apparatus in Embodiment 5.
Figure 16:
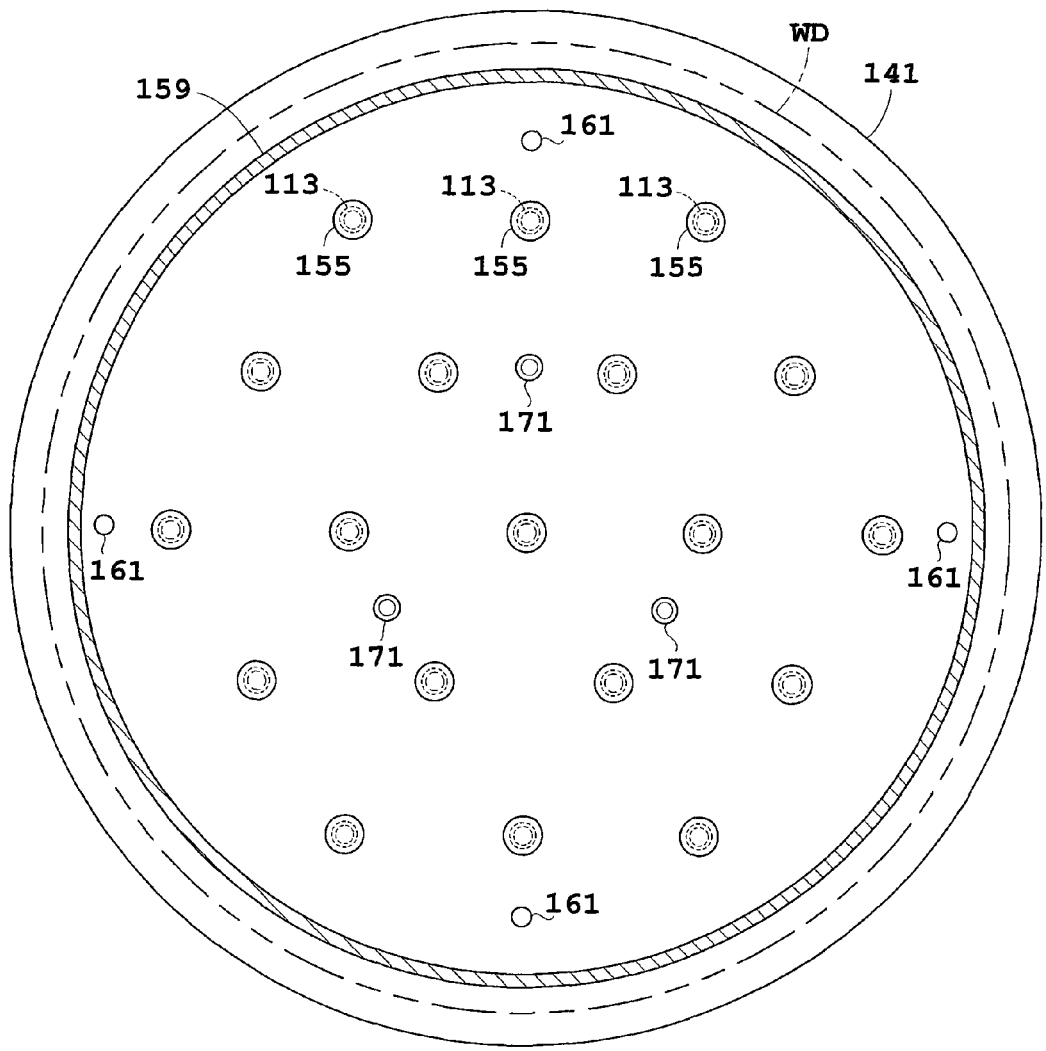
FIG. 16 is a plan view of a heat-treating plate.
Figure 17:
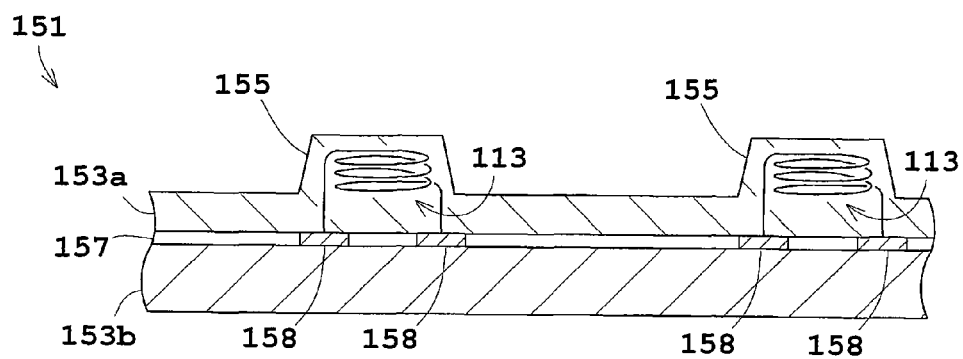
FIG. 17 is a sectional view of a principal portion of a second detecting sheet.

FIG. 15 is a view in vertical section showing an outline of a heat treatment apparatus in Embodiment 3. FIG. 16 is a plan view of a heat-treating plate. FIG. 17 is a sectional view of a principal portion of a second detecting sheet. Like reference numerals are used to identify like parts which are the same as in Embodiment 4 and will not particularly be described.

A heat-treating plate 141 in plan view is circular and has a slightly larger diameter than a dummy wafer WD and an ordinary wafer W (hereinafter referred to simply as the dummy wafer WD and the like as appropriate). The upper surface of the plate 141 is flat. The dummy wafer WD has the same shape as the ordinary wafer W. The heat-treating plate 141 is formed of a metal such as copper or aluminum having high thermal conductivity, for example. The heat-treating plate 141 has a heating element 143 such as a mica heater mounted therein. A heat transfer portion 145 between the heating element 143 and the upper surface of heat-treating plate 141 has a plurality of heat pipes, not shown, embedded therein. Cooling grooves, not shown, are formed between the heat pipes for circulating a cooling fluid.

A second detecting sheet 151 is laid to cover the upper surface of the heat-treating plate 141. The second detecting sheet 151 in Embodiment 5 has a plurality of projections 155 formed on the upper surface of a sheet of a heat-resistant resin (hereinafter referred to as "heat-resistant resin sheet") 153 for contacting and supporting the dummy wafer WD and the like. Sensor coils 113 are mounted in the projections 155. The second detecting sheet 151 is placed in a predetermined position without being fixed to the heat-treating plate 141. The heat-resistant resin sheet 153 corresponds to the second sheet-like object in this invention.

As shown in the drawings, the projections 155 are arranged regularly. Each projection 155 is pillar-shaped to rise from the surrounding area, with a diameter slightly enlarging from the upper end, which contacts the dummy wafer WD and the like, to the lower end.

As shown in FIG. 17, the heat-resistant resin sheet 153 is divided into an upper sheet 153a and a lower sheet 153b. The projections 155 noted above are formed by etching, for example, on the upper surface of the upper sheet 153a. The sensor coils 113 are mounted in the projections 155. In Embodiment 5, the sensor coils 113 are arranged to have the axes thereof extending substantially perpendicular to the surfaces of the dummy wafer WD contacted and supported by the projections 155.

A wiring layer 157 is interposed between the upper sheet 153a and lower sheet 153b. The wiring layer 157 has wires 158 formed thereon. The wires 158 are connected to the respective sensor coils 113 through contact holes or the like extending vertically through the upper sheet 153a. The wires 158 are gathered in form of parallel connection to an output terminal 119 disposed peripherally of the second detecting sheet 151. The wires 158 are formed of copper foil, for example.

The second detecting sheet 151 further includes a sealer 159 for contacting edge regions of the dummy wafer WD and the like. The sealer 159 is ring-shaped, and has a diameter slightly smaller than the outside diameter of the dummy wafer WD and the like in plan view, and a height equal to that of the projections 155. The sealer 159 contacts the dummy wafer WD and the like to close lateral areas of a space formed between the second detecting sheet 151 and the dummy wafer WD and the like (hereinafter referred to as "minute space "ms""). The sealer 159 corresponds to the closing device in this invention.

Such second detecting sheet 151 is formed by etching process or laser punching. The upper and lower sheets 153a and 153b may be formed of the material noted in Embodiment 4 for forming the upper and lower sheets 111a and 111b. The above second detecting sheet 151 and second measuring unit 105 constitute the second thermometric system in this invention.

In this embodiment, exhaust bores 161 and perforations 171 extend through the heat-treating plate 141 and second detecting sheet 151.

The exhaust bores 161 are formed for exhausting gas from the minute space "ms". The number of exhaust bores 161 is plural (four), One end of exhaust piping 163 is connected commonly to the exhaust bores 161 adjacent the lower surface of the heat-treating plate 141. A vacuum suction source 165 is connected to the other end of the exhaust piping 163. This vacuum suction source 163 is a vacuum utility provided for a cleanroom, for example. The exhaust piping 163 has a switch valve 167 for regulating pressure (negative pressure), and a pressure gauge 169 for measuring the pressure. The exhaust piping 163 and vacuum suction source 165 function as an exhaust device.

The number of perforations 171 is three, and each perforation 171 has a lift pin 173 extending therethrough. The lift pins 173 have lower ends thereof connected to a lift mechanism, not shown, for vertically moving the lift pins 173. The lift pins 173 are vertically movable by the lift mechanism to transfer the dummy wafer WD and the like to and from a transport device not shown.

A controller 175 performs an overall control of the apparatus, i.e. controls output of the heating element 143 noted hereinbefore, switching operation of the switch valve 167, and operation of the lift mechanism. These controls are performed based on a recipe stored beforehand. The output of the heating element 143 is adjusted appropriately by referring to temperatures obtained from the first measuring unit 105. The controller 175 refers to results of detection by the pressure gauge 169 for controlling the switching operation of the switch valve 167. The controller 175 is realized by a central processing unit (CPU) which performs various processes, a RAM (Random Access Memory) used as the workspace for operation processes, and a storage medium such as a fixed disk for storing a variety of information.

Figure 18:
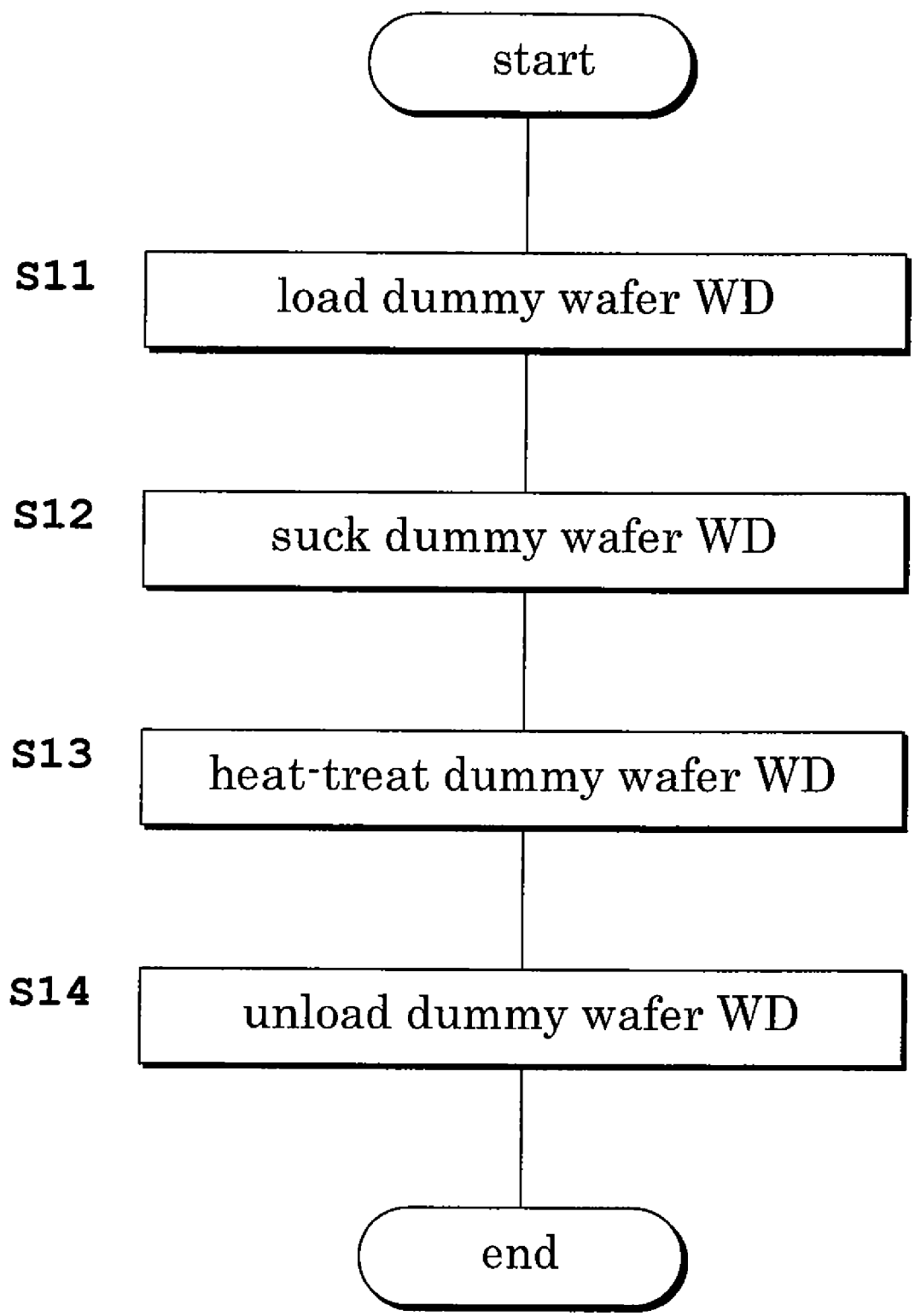
FIG. 18 is a flow chart showing a procedure of heat-treating a dummy substrate.

Operation of the substrate heat treatment apparatus in Embodiment 5 will be described next, separately for treatment of a dummy wafer WD and for treatment of an ordinary wafer W. FIG. 18 is a flow chart illustrating a procedure of heat-treating a dummy wafer WD. The temperature control of the heating element 143 is assumed to have already been carried out according to the recipe, and will be omitted from the following description.

[Treatment of Dummy Wafer WD]

<Step S11> Load Dummy Wafer WD

The controller 175 operates the lift mechanism (not shown) to raise the lift pins 173 and receive a dummy wafer WD from the transport device not shown. Then, the lift pins 173 are lowered to place the dummy wafer W on the second detecting sheet 151. At this time, the projections 155 and sealer 159 contact the lower surface of the dummy wafer WD. As a result, a closed minute space "ms" is formed between the dummy wafer WD and second detecting sheet 151. The sensor coils 113 and coils C are sufficiently close to each other, with the axes of opposed sensor coils 113 and coils C substantially in alignment.

As the dummy wafer WD is placed on the second detecting sheet 151, the second measuring unit 105 starts measurement. That is, the sensor coils 113 are caused to transmit predetermined transmitter pulses, and temperature is measured based on electromagnetic waves received by the sensor coils 113. The second measuring unit 105 outputs measured temperatures to the controller 175.

<Step S12> Suck Dummy Wafer WD

The controller 175 opens the switch valve 167 to exhaust the gas (i.e. air or nitrogen) from the minute space "ms" through the exhaust bores 161. The pressure in the minute space "ms" is adjusted to a negative pressure, whereby the dummy wafer WD is sucked toward the heat-treating plate 141.

<Step S13> Heat-Treat Dummy Wafer WD

A predetermined heat treatment is carried out for the dummy wafer WD while maintaining the dummy wafer WD in the suction-supported state for a predetermined time. At this time, the controller 175 refers to the temperature of the dummy wafer WD obtained from the second measuring unit 105 as appropriate, and adjusts the output of the heating element 143 to control the temperature of the dummy wafer WD.

<Step S14> Unload Dummy Wafer WD

Upon completion of the heat treatment performed for the predetermined time, the controller 175 closes the switch valve 167 to return the pressure in the minute space "ms" to atmospheric pressure. Then, the lift pins 173 are raised to move the dummy wafer WD upward and transfer the dummy wafer WD to the transport device not shown.

[Treatment of Ordinary Wafer W]

The procedure of treating an ordinary wafer W itself is similar to that of treating the dummy wafer WD shown in FIG. 18. However, in the treatment of an ordinary wafer W, the second measuring unit 105 does not measure temperature in the series of processes from step S11 to step S14. This point differs from the procedure of treating dummy wafer WD.

The controller 175, for example, refers to results of the treatment of the dummy wafer WD performed in advance of the treatment of the wafer W, and stores a recipe set or corrected beforehand. Based on this recipe, results of detection by the pressure gauge 169 and so on, the controller 175 performs controls to suck the introduced wafer W (steps S11, S12) and carry out heat treatment (step S13).

Thus, according to this embodiment, the second detecting sheet 151 with the sensor coils 113 mounted in the projections 155 can place the sensor coils 113 sufficiently close to the thermometric elements "s" of the dummy wafer WD, i.e. to a distance less than the thickness of the upper sheet 111a. The second detecting sheet 151 can therefore accurately detect electromagnetic waves corresponding to damped oscillations of the crystal oscillators X. The second measuring unit 105 can accurately measure the temperature of dummy wafer WD. Where the dummy wafer WD has an increased number of thermometric elements "s" arranged at short intervals, temperature may be acquired from an increased number of locations on the dummy wafer WD while maintaining the accuracy of detection and measurement.

The second detecting sheet 151 with the projections 155 can detect the temperature of the dummy wafer WD accurately while restricting an area of contact with the dummy wafer WD. This leads to proper treatment of ordinary wafers W.

The second detecting sheet 151 is formed of the heat-resistant resin sheet 153, and the sensor coils 113 are arranged in this resin sheet 153. Thus, there is no possibility of metal contamination of the dummy wafer WD and the like. Thus, the dummy wafer WD may be used only at a time of starting or maintaining the apparatus, and ordinary wafers W may be loaded into the apparatus at ordinary times for performing a predetermined treatment.

The heat-resistant resin sheet 153 allows the temperature of the dummy wafer WD to be measured accurately even when the wafer WD has a high temperature.

Further, by suction-supporting the dummy wafer WD, heat treatment can be performed uniformly over the surface of the wafer WD. Even when variations occur in temperature over the surface of heat-treating plate 141, the second detecting sheet 151 transmits the temperature to the dummy wafer WD and the like while absorbing the variations. This inhibits variations in heat history over the surface of the dummy wafer WD and the like.

Figure 19:
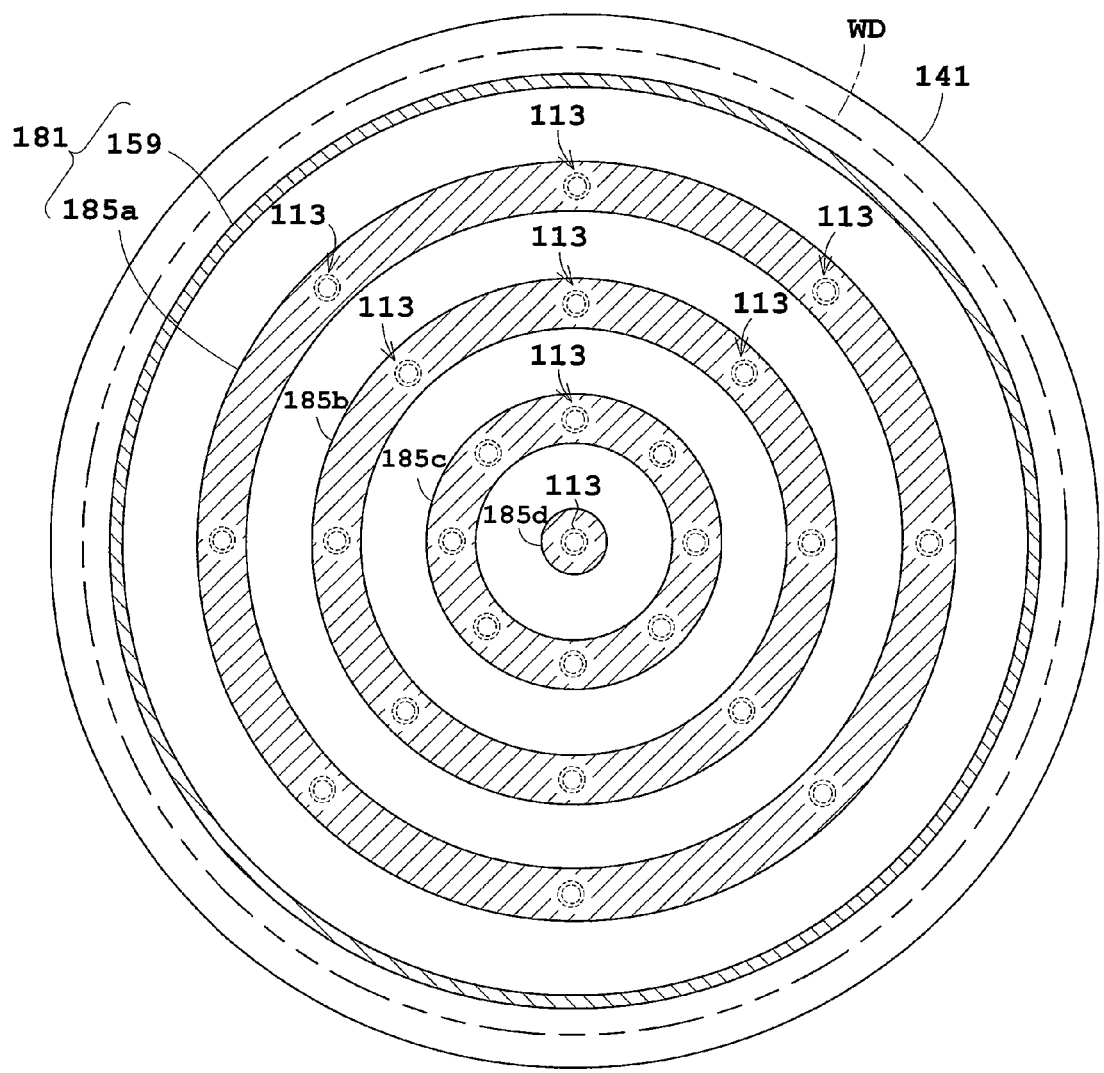
FIG. 19 is a plan view of a modified second detecting sheet.

This invention is not limited to the foregoing embodiments, but may be modified as follows:

(1) In Embodiment 5 described above, the second detecting sheet 151 has the projections 155 arranged separately from one another in dots. The invention is not limited to such arrangement. Reference is made to FIG. 19. FIG. 19 is a plan view of a modified second detecting sheet 181. The second detecting sheet 181 shown in FIG. 19 has four ring-shaped projections 185a, 185b, 185c and 185d having different diameters formed on a resin sheet. The projections 185a-185d are arranged in concentric circles. Sensor coils 113 are mounted in various positions of the projections 185a-185d. With such second detecting sheet 181 also, the temperature of the dummy wafer WD can be measured conveniently.

(2) In Embodiment 5 described above, the sensor coils 113 are mounted in the respective projections 155 of the second detecting sheet 151. The invention is not limited to this arrangement. The sensor coils 113 may be arranged in trough portions in contrast with the projections 155 of the second detecting sheet 151 (i.e. in recesses in the upper surface of the upper sheet 153a). In this case, the sensor coils 113 may be exposed from surfaces of the trough portions. This arrangement also is effective for preventing metal contamination of the dummy wafer WD and the like.

(3) In Embodiment 4 described above, the sensor coils 113 are mounted inside the resin sheet 111. The invention is not limited to this arrangement. As long as the influence of metal contamination of the dummy wafer WD is at a negligible level, the second detecting sheet may be modified as appropriate to have the sensor coils 113 exposed from the surface thereof.

(4) In Embodiment 4 described above, the second detecting sheet 151 and second thermometric system are applied to the heat treatment apparatus. The invention is not limited to this application. The second detecting sheet and second thermometric system are applicable to a resist coating apparatus, a developing apparatus, a cleaning apparatus, an exposing machine, an etcher, a film forming apparatus (CVP), an apparatus for inspecting film thickness or line width, a cool plate which is one of heat treatment apparatus, and substrate treating apparatus for performing other treatments.

The second detecting sheet and second thermometric system may be used to detect and measure temperature of the dummy wafer WD transported along a transport path. The transport path may be from an indexer unit to a heat-treating section, from a resist coating section to a developing section, or between any other treating sections. The second detecting sheet 151 may be installed on a support table used for temporarily storing the dummy wafer WD and the like as placed on the second detecting sheet 151.

(5) In each of Embodiments 4 and 5 described above, various dummy wafers WD may be selected for use as long as the wafers WD have thermometric elements "s". For example, thermometric elements "s" may be embedded in the bodies of wafers WD, or arranged on the upper surfaces or lower surfaces of wafers WD. The crystal oscillators X have been described as having ceramic containers. Instead, the crystal oscillators X may have metal containers. Further, the coils C may be replaced with antennas of various constructions connected to the crystal oscillators X.

(6) In each of Embodiments 1-5 described above, the wafer W and dummy wafer WD are shaped circular. Instead, a rectangular or otherwise shaped substrate or dummy substrate may be used. Then, the circular sealer 59 or 159 may be changed to a different shape, as appropriate, according to the shape of the substrate or dummy substrate.

(7) In each of Embodiments 3 and 5 described above, the heat transfer portion 45 or 145 has heat pipes embedded therein. The invention is applicable also to a heat treatment apparatus without heat pipes.

(8) The embodiments described above may be combined as appropriate to form a first or second detecting sheet, a first or second thermometric system, or a heat treatment apparatus.

This invention may be embodied in other specific forms without departing from the spirit or essential attributes thereof and, accordingly, reference should be made to the appended claims, rather than to the foregoing specification, as indicating the scope of the invention.

What is claimed is:

1. A detecting sheet for supporting a dummy substrate, comprising:
    a sheet-like object formed of resin and laid to cover the upper surface of a heat-treating plate for supporting the dummy substrate, said dummy substrate including thermometric elements each with a crystal oscillator having at least a coil or an antenna connected thereto; and
    sensor coils arranged in said sheet-like object for wireless communication with said thermometric elements.

2. A sheet as defined in claim 1, wherein said sensor coils are mounted inside said sheet-like object.

3. A sheet as defined in claim 1, wherein:
    said sheet-like object has projections formed thereon for contacting and supporting the dummy substrate; and
    said sensor coils are mounted in said projections.

4. A sheet as defined in claim 1, wherein said sensor coils are arranged to oppose said thermometric elements when the dummy substrate is placed on the detecting sheet.

5. A sheet as defined in claim 1, further comprising:
    wires arranged inside said sheet-like object and connected to said sensor coils; and
    an output terminal for connecting said wires to an external circuit.

6. A thermometric system for measuring a temperature of a dummy substrate including thermometric elements each with a crystal oscillator having at least a coil or an antenna connected thereto, said system comprising:
    a sheet-like object formed of resin and laid to cover the upper surface of a heat-treating plate for supporting the dummy substrate;
    sensor coils arranged in said sheet-like object for wireless communication with said thermometric elements; and
    a measuring device for measuring the temperature based on frequencies of electromagnetic waves received by said sensor coils.

7. A system as defined in claim 6, wherein said sensor coils are mounted inside said sheet-like object.

8. A system as defined in claim 6, wherein:
    said sheet-like object has projections formed thereon for contacting and supporting the dummy substrate; and
    said sensor coils are mounted in said projections.

9. A system as defined in claim 6, wherein said measuring device includes a communication device for causing said sensor coils to send transmitter pulses with frequencies corresponding to natural frequencies of said crystal oscillators, and detecting the electromagnetic waves received by said sensor coils.

* * * * *